United States Patent [19]
Kawashima et al.

[11] Patent Number: 5,196,159
[45] Date of Patent: Mar. 23, 1993

[54] FAST REACTOR

[75] Inventors: Masatoshi Kawashima; Kazumi Miyagi, both of Yokohama; Masaaki Iida, Chigasaki; Katutada Aoki, Kamakura; Norihiko Handa, Narashino, all of Japan

[73] Assignee: Kabushiki Kaisha Toshiba, Kawasaki, Japan

[21] Appl. No.: 735,355

[22] Filed: Jul. 24, 1991

[30] Foreign Application Priority Data

| Jul. 24, 1990 [JP] | Japan | 2-195936 |
| Jul. 27, 1990 [JP] | Japan | 2-200320 |
| Nov. 28, 1990 [JP] | Japan | 2-327562 |

[51] Int. Cl.$^5$ .................................... G21C 7/28
[52] U.S. Cl. ................................ 376/221; 376/458
[58] Field of Search ............... 376/221, 220, 458, 406, 376/404, 346, 210, 405, 334; 976/DIG. 134

[56] References Cited

U.S. PATENT DOCUMENTS

| 3,287,225 | 11/1966 | Ackroyd et al. | 376/220 |
| 3,627,634 | 12/1971 | Guenther et al. | 376/303 |
| 3,847,733 | 11/1974 | Ventre | 376/404 |
| 3,932,214 | 1/1976 | Aubert et al. | 376/405 |
| 4,762,672 | 8/1988 | Kurihara et al. | 376/334 |

FOREIGN PATENT DOCUMENTS 2-222861  9/1990  Japan .

OTHER PUBLICATIONS

Moss et al, "IECEC-87 Intersociety Energy Conversion Engineering Conference", Aug. 1987, pp. 1596-1604.

Primary Examiner—Daniel D. Wasil
Attorney, Agent, or Firm—Foley & Lardner

[57] ABSTRACT

A fast reactor comprises a reactor vessel to be arranged vertically in a reactor building, a reactor vessel upper structure disposed on an upper portion in the reactor vessel, a drum structure suspended from the reactor vessel structure into a central portion in the reactor vessel so as to define an annular portion between an outer periphery of the drum structure and an inner periphery of the reactor vessel, and a reactor core disposed in the drum structure. A reflector is disposed in the reactor vessel and is vertically movable along an outer periphery of the reactor core. The reflector may be composed of grain materials movable by gravity. An intermediate heat exchanger is further disposed at a portion above the reactor core and an electromagnetic pump is disposed in the reactor vessel for circulating coolant. The reactivity of the reactor core can be controlled by the reflector to thereby reduce the neutron irradiation amount to the reactor vessel.

15 Claims, 25 Drawing Sheets

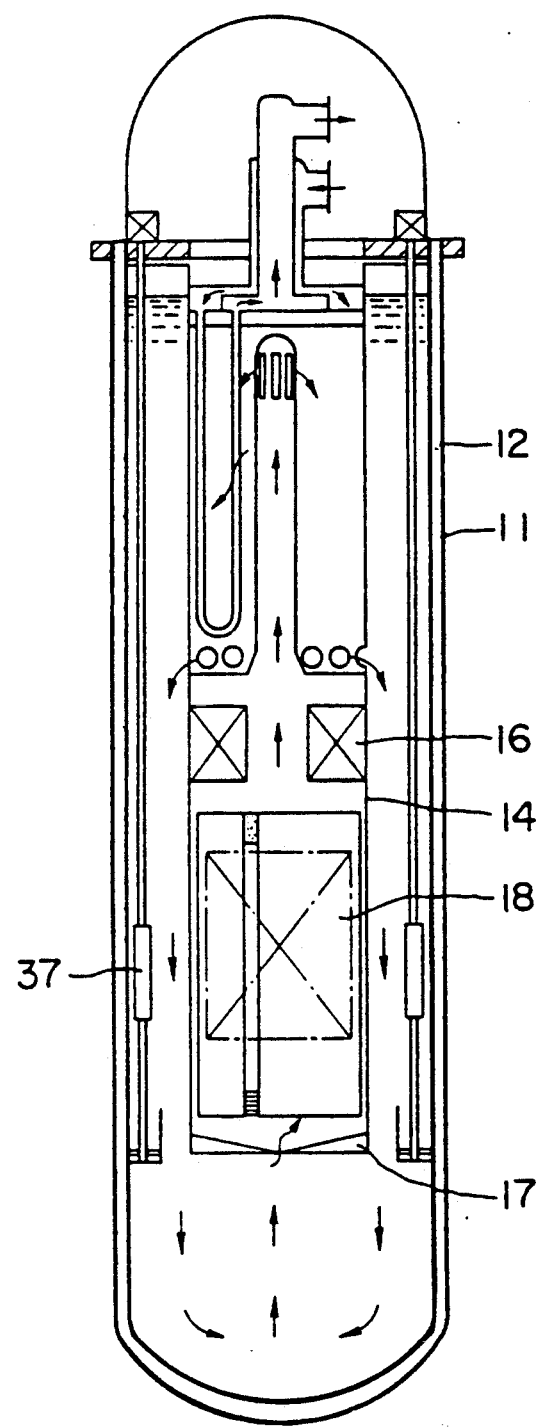
F I G. 4

FAST REACTOR

BACKGROUND OF THE INVENTION

The present invention relates to a fast reactor and more particularly to a fast breeder reactor utilizing liquid metallic sodium as a coolant.

In a conventional art of this field are known methods of controlling a reactivity of a fast reactor, for example, one in which a charging condition of neutron absorbers such as control rods is changed and another in which a leak amount of neutrons is controlled by utilizing a reflector. The latter method is particularly effective for a small size reactor core, and in past, an experimental reactor SEFOR was run (SEFOR, Critical experiment: 1969, $UO_2$-$PuP_2$ fuel) Na cooling, Thermal power: 20 MW, Core size: about 566 l). The SEFOR reactor was provided with a reflector area divided into sectors on the outside of the reactor and the divided reflector sectors are moved upward and downward to thereby change relative positional relationship between the reflector sectors and the reactor core portion, thus controlling the leakage of the neutrons.

A military use 10 MWe type power plant in the U.S.A. as a design example of a small size reactor utilizing a reflector has been discussed in an IECE-87 Intersociety Energy Conversion Engineering Conference report by T. A. Moss and E. B. Baumeister, entitled A.Liquid-Metal Reactor/Air Brayton-cycle Option for a Multimegawatt Terrestrial Power (MTP) Plant" Proc. of IECEC-87. p.1596.

The reactor core of this reference is aimed to provide a long-life core by using an enriched uranium oxide fuel. The core power was small 55 MWt (5500 KWe). A reactivity control was done by vertically moving a reflector disposed outside a reactor vessel.

The applicant of the present invention filed a Japanese patent application on Jan. 19, 1989 which discloses a reflector and an elevating mechanism for the reflector disposed on the outer peripheral portion of the reactor vessel (Japanese Patent Laid-open (KOKAI) Specification No. 2-222861).

In the structure disclosed in this laid-open specification, the reflector takes a position opposing a lower end of the reactor core at an initial starting stage of the reactor burning cycle, a reactor core fuel disposed at the lower end of the reactor core is then burnt, and the reactor core fuel is successively burnt from the lower end towards the upper end in accordance with successive elevation of the reflector.

As described, the technology in which the reflector area is provided opposing the reactor core to thereby control the leakage of the neutrons is known as an effective method of controlling the reactivity of the reactor core. However, in a conventional fast reactor, a reflector is disposed at a portion external to the reactor vessel, and for this reason, a large amount of neutrons is irradiated to the reactor vessel, resulting in a problem of narrow selection of the reactor running methods and materials for the reactor vessel. In addition, an elevating device for the reflector is disposed on a portion external to the reactor vessel, such that the arrangement of peripheral equipment around the fast reactor is made complicated and occupies a relatively large space.

SUMMARY OF THE INVENTION

An object of the present invention is to substantially eliminate defects or drawbacks encountered in the prior art and to provide a fast reactor capable of, while effectively carrying out reactivity control of the reactor core, reducing neutron irradiation to a reactor vessel and improving the reliance thereof.

This and other objects can be achieved according to the present invention by providing a fast reactor comprising a reactor vessel to be arranged vertically in a reactor building, a reactor vessel upper structure disposed on an upper portion in the reactor vessel, a drum structure suspended from the reactor vessel upper structure to substantially a central portion in the reactor vessel so as to define an annular portion between an outer periphery of the drum structure and an inner periphery of the reactor vessel, a reactor core disposed in the drum structure, an intermediate heat exchanger disposed at a portion above the reactor core, an electromagnetic pump disposed in the reactor vessel for circulating a coolant, and a reflector area disposed in the reactor vessel to be vertically movable along an outer periphery of the reactor core.

In preferred embodiments, a reflector is disposed in the reflector area to be vertically movable along the outer periphery of the reactor core. The reflector is composed of materials each in the form of a grain and the reflector materials are stored in a storage tank disposed in an upper portion of the reflector area, the storage tank being provided with an opening through which the reflector materials are supplied into the reflector area. The storage tank may be composed of a plurality of sections each provided with openings through which the reflector materials are supplied into the reflector area. The reflector area is moved vertically from a lower portion corresponding to a lower portion of the reactor core at an initial burning stage to an upper portion of the reactor core.

The reactor core has a vertically columnar shape satisfying an equation of $H/D > 1$ and a ratio $L/H$ from about 0.3 to 0.7 in which the reactor core has a reactor core fuel portion having a height H and an equivalent diameter D of the reactor core and the reflector area has an effective vertical length L.

According to the characters of the fast reactor of the present invention, the reflector area for controlling the reactivity of the reactor core is disposed vertically movable in the reactor vessel, so that the neutron irradiation amount to the reactor vessel is significantly reduced in comparison with a conventional fast reactor, thus remarkably improving the reliance in operation of the reactor core.

BRIEF DESCRIPTION OF THE DRAWINGS

For a better understanding of the present invention and to show how the same is carried out, reference will now be made to the accompanying drawings, in which:

FIGS. 4 to 7 are views also similar to that of FIG. 1, 2, or 3 representing modifications of the present invention in which an electromagnetic pump is arranged at a portion other than a lower portion of a reactor core;

DESCRIPTION OF THE PREFERRED EMBODIMENTS

Figure 1:
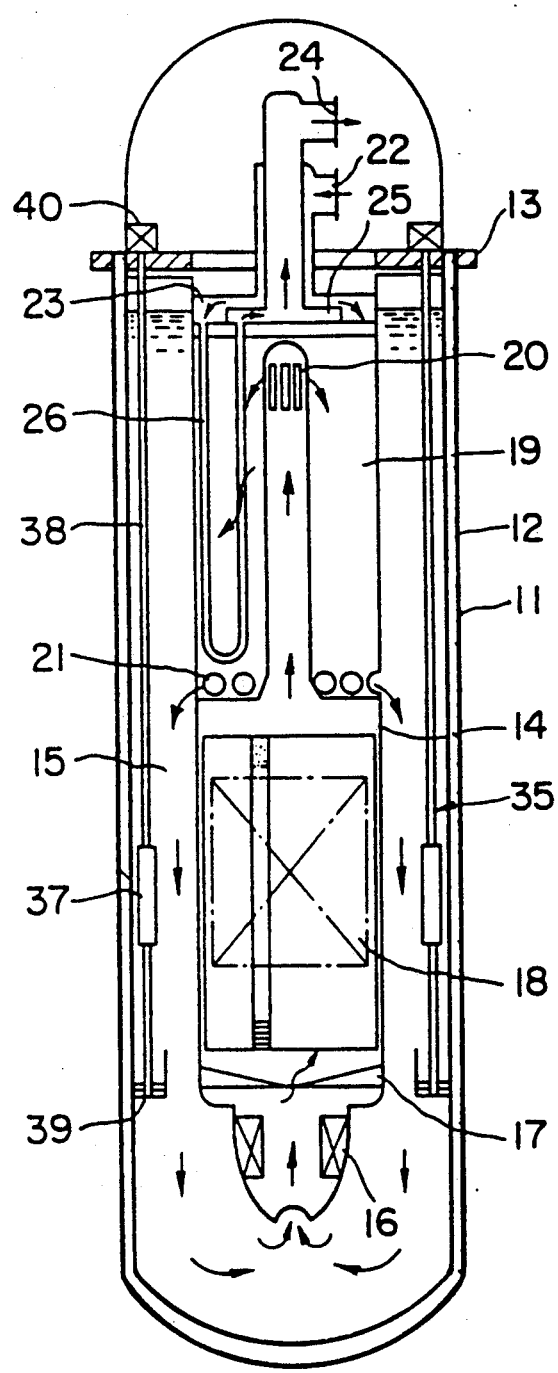
FIG. 1 is an elevational section of a fast reactor according to a first embodiment of the present invention.

FIG. 1 represents the first embodiment of a fast reactor according to the present invention.

Referring to FIG. 1, a guard vessel 11 surrounds a reactor vessel (RV) 12 having an upper end portion at which an RV upper structure 13 is arranged. The RV 12 is installed in a reactor building in a vertical fashion. A suspension drum 14 is suspended from the RV upper structure 13 to a central portion in the RV 12 and an annulus portion 15 is defined between the inner peripheral surface of the RV 12 and the outer peripheral surface of the suspension drum 14.

In the suspension drum 14 are disposed an electromagnetic pump 16, a flow mixing device 17, a reactor core 18 and an intermediate heat exchanger 19 from the lower side thereof in this order. Primary sodium is flows out from the reactor core 18, enters the intermediate heat exchanger 19 through a primary outlet port 20 and then flows out through a primary outlet port 21 of the intermediate heat exchanger 19. The primary sodium flown out through the primary outlet port 21 is lowered in the annulus portion 15 and enters the reactor core 18 through the electromagnetic pump 16 and then the flow mixing device 17.

Inlet plenum 23 and outlet plenum 25 connected respectively to secondary inlet port 22 and secondary outlet port 24 are disposed on the upper portion of the intermediate heat exchanger 19. Both the plenums 23 and 25 are mutually connected to a heat transfer tube 26 in the form of a U-shape. Secondary sodium flows into the inlet plenum 23 through the secondary inlet port 22 carries out the heat exchanging operation with the primary sodium during the passing through the heat transfer tube 26 towards the outlet plenum 25, and after this heat exchanging operation, the secondary sodium is fed outward through the secondary outlet port 24.

A reflector area 35 is provided in the annulus portion 15 on the side of the inner periphery of the RV 12 and a reflector 37 is arranged in the reflector area 35. The reflector 37 is driven vertically in the RV 12 by an electric motor 40 disposed on the upper structure 13 through a driving mechanism 38 provided with a reflector fall-down preventing mechanism 39 at its lowermost end. The reflector 37 is located to face the lower end of the reactor core 18 at the initial burning stage thereof to burn the reactor core fuel disposed at the lower end portion of the reactor core 18 and the reflector 37 is then successibly elevated upward to burn the reactor core fuel from the lower portion towards the upper portion.

Supposing that the reactor core 18 has a height H of a reactor core fuel portion and an equivalent diameter D of the reactor core and the reflector 37 has an effective length L, the reactor core 18 is designed to have a vertical columnar shape satisfying an equation $H/D > 1$ and a ratio $L/H$ being within a range of 0.4 to 0.6.

The fast reactor first embodiment of the operates as follows.

The primary sodium flows out from the reactor core 18 enters the intermediate heat exchanger 19 through the primary inlet port 20 and then flows out from the primary outlet port 21. The sodium is thereafter lowered in the annulus portion 15, then sucked by the electromagnetic pump 16 and enters the reactor core 18 through the flow mixing device 17.

While, the secondary sodium flows into the inlet plenum 23 through the secondary inlet port 22, guided to the outlet plenum 23 through the heat transfer tube 26 and is then fed outward through the secondary outlet port 24. During the passing through the heat transfer tube 26, the heat exchanging operation is carried out between the primary and secondary sodiums.

The reflector 37 is positioned at its lower end facing the lower end of the reactor core 18 at a time of the initial burning stage thereof, and hence, the reactor core fuel is burnt from the lower portion thereof. The reflector 37 is thereafter elevated gradually upward along the driving mechanism 38 by the actuation of the driving motor 40 to burn the reactor core fuel successively in accordance with this elevating motion of the reflector. Neutrons leaking from the reactor core 18 are reflected by the reflector 37 thereby to control the leakage of the neutrons and thus alleviate irradiation of the RV 12.

According to this embodiment, as described, since the reactor core 18 is controlled from the outside portion thereof, the intermediate heat exchanger 19 is located on the upper portion of the reactor core 18. Hence, the reactor vessel 12 can be made compact, and for example, the diameter the reactor vessel 12 will be designed to be of about 2 m in a reactor having a power of 50000 KWe.

In addition, since the reflector 37 is disposed inside the reactor vessel 12, the irradiation amount of the neutrons can be significantly reduced, resulting in improvement of the reliance of the reactor operation.

Figure 2:
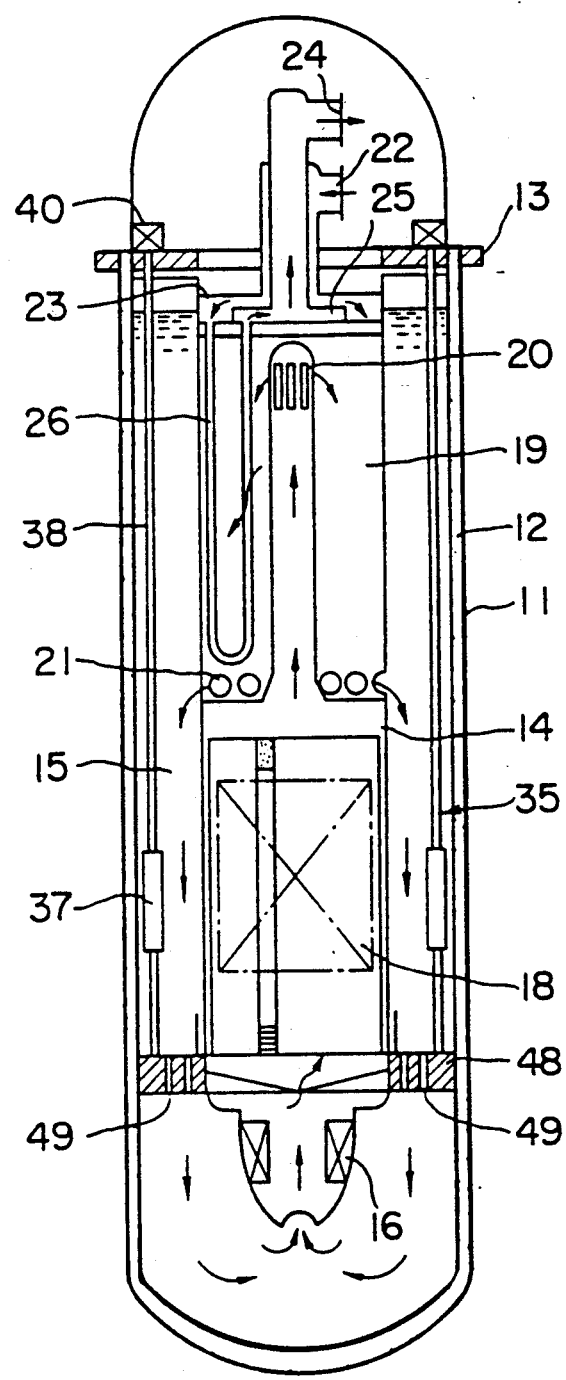
FIGS. 2 and 3 are views similar to that of FIG. 1 representing second and third embodiments of the present invention.

FIG. 2 represents the second embodiment of the fast reactor according to the present invention, in which the same reference numerals designate elements and members corresponding to those shown in FIG. 1.

Referring to FIG. 2, a partition plate 48 is disposed below the lower end of the suspension drum 14 with a slight space therebetween so as to cross the interior of the reactor vessel (RV) 12, and the reactor core 18 is positioned above the partition plate 48. The electromagnetic pump 16 is secured to the partition plate 48.

The partition plate 48 is provided with a number of perforations 49 each axially extending in the RV 12 through which the sodium passes.

The other structures of this embodiment are substantially the same as those of the first embodiment shown in FIG. 1.

According to this embodiment, since the reactor core 18 is rested on the partition plate 48, the installation thereof can be made stable.

Figure 3:
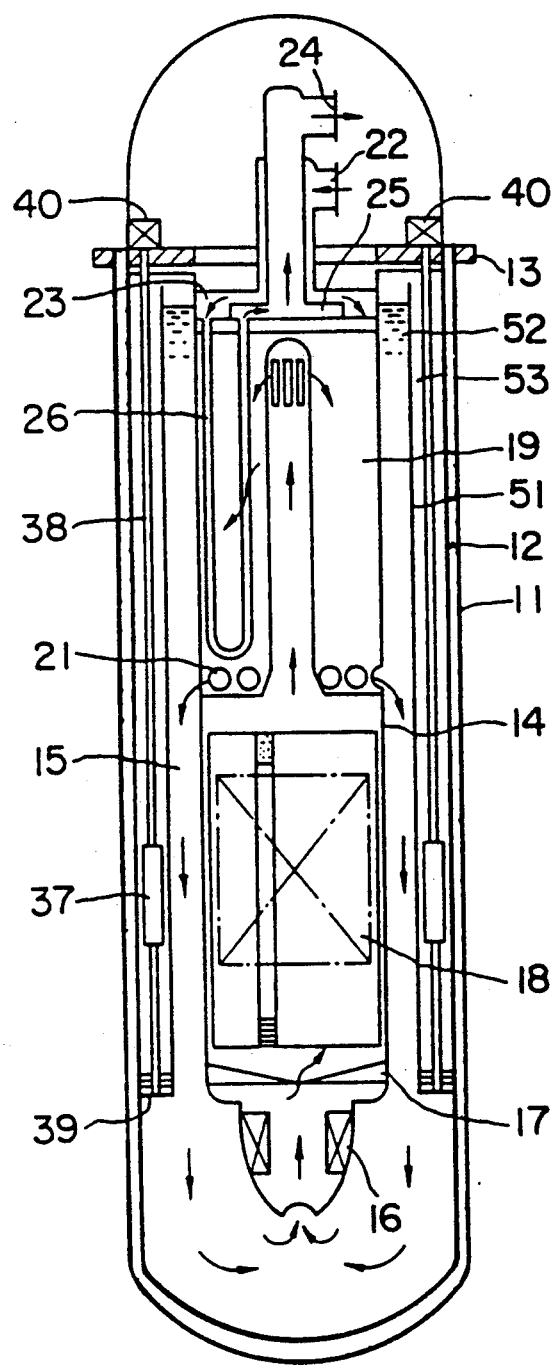

FIG. 3 represents the third embodiment according to the present invention, in which the same reference numerals designate elements and members corresponding to those of FIG. 1 or 2.

In the embodiment of FIG. 3, a cylindrical member 51 is further located between the inner peripheral surface of the RV 12 and the outer periphery of the suspension drum 14 so as to divide the annulus portion 15 into inner and outer sections, in which the inner section is filled up with sodium 52 and the outer section is filled up with a cover gas 53. Further, in this embodiment, as shown in FIG. 3, the reflector 37, the reflector driving mechanism 38 and the reflector fall-down preventing mechanism 39 are located in the outer section of the annulus portion 15 between the RV 12 and the cylindrical member 51.

The other structures are substantially the same as those of FIG. 1.

According to this third embodiment, the reflector 37 is elevated in the atmosphere of the cover gas 53 and the reflector driving mechanism does not pass in the sodium 52, thus the reliance thereof being improved. In this embodiment, it is also possible to locate the partition plate 48 as shown in FIG. 2 in the RV 12 to support the reactor core 18.

FIGS. 4 to 7 show modified embodiments in which the electromagnetic pump 16 is disposed at a portion other than below the lower position of the reactor core 18.

In the embodiment of FIG. 4, the reactor core 18 is disposed in the suspension drum 14 as shown in FIG. 1, but the electromagnetic pump 16 is located above the upper portion of the reactor core 18. The other arrangement of this embodiment is substantially the same as that of FIG. 1.

According to this embodiment, since the electromagnetic pump 16 is disposed above the reactor core 18, the electromagnetic pump 16 can be taken out from the upper side of the suspension drum 14 for periodical maintenance or inspection, for example. This working can be done without removing the reactor core fuel from the reactor core 18.

Figure 5:
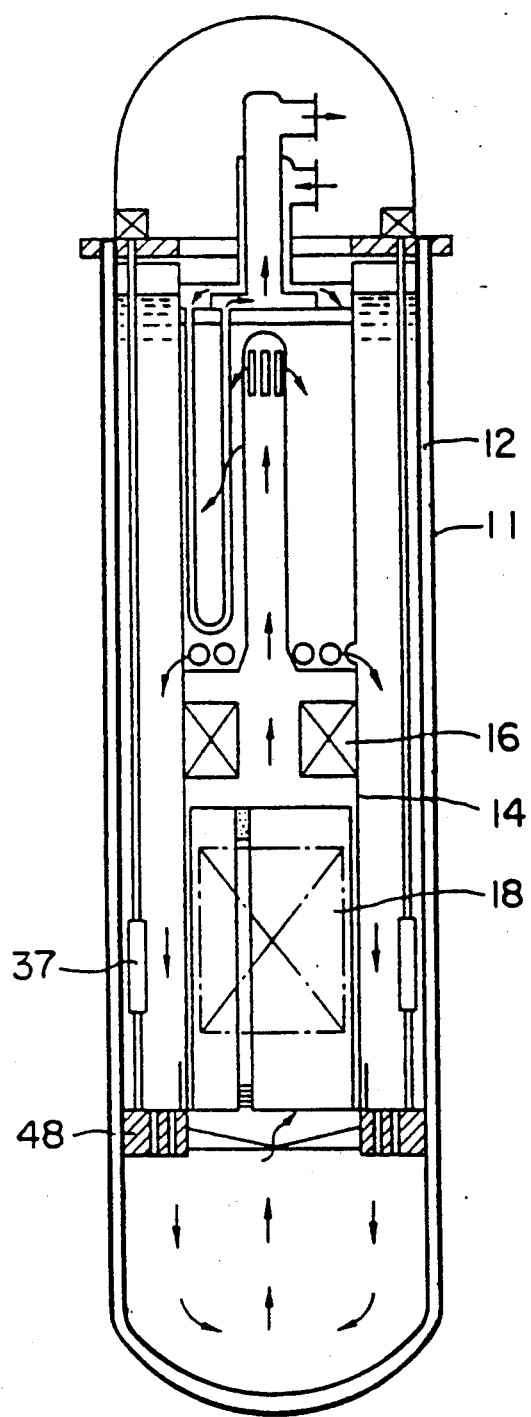

In the embodiment of FIG. 5, the partition plate 48 of the structure described with reference to the embodiment of FIG. 2 is located in the RV 12 and the reactor core 18 is located thereabove. The electromagnetic pump 16 is disposed above the reactor core 18 as shown in FIG. 4. According to this embodiment, substantially the same effects as those of the embodiment of FIG. 4 will be achieved.

Figure 6:
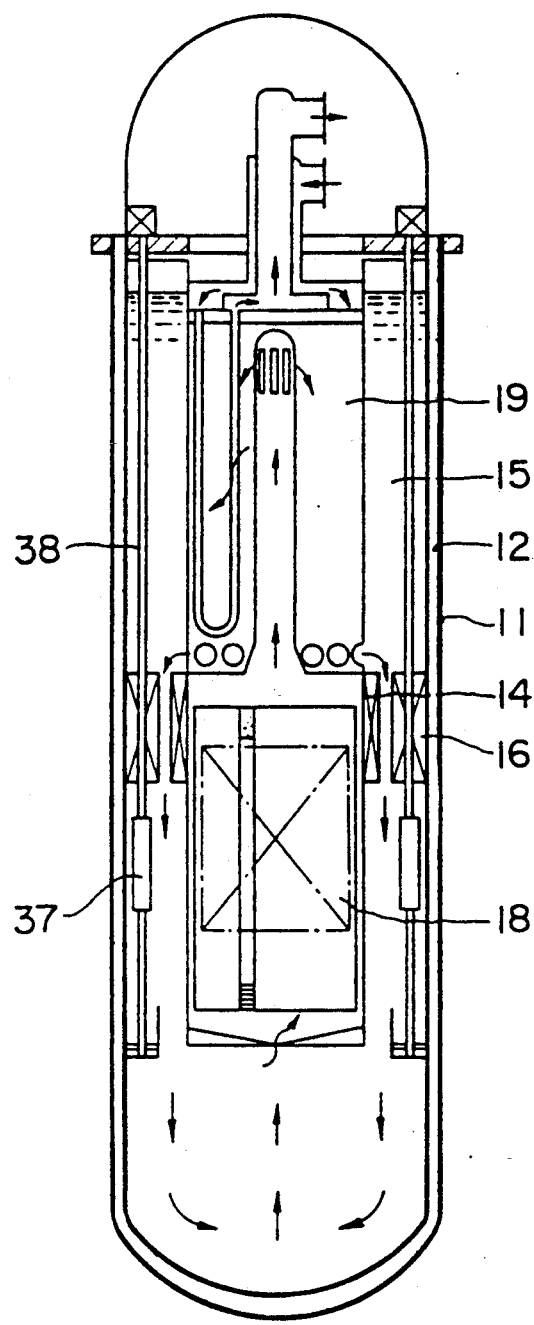

In the embodiment of FIG. 6, the electromagnetic pump 16 is disposed in the annulus portion 15 between the inner periphery of the RV 12 and the outer periphery of the suspension drum 14 in which the reactor core 18 is disposed. In this embodiment, it is necessary for the electromagnetic pump 16 to be provided with a path through which the reflector driving mechanism 38 can pass. The other arrangement is however substantially the same as that of the embodiment represented by FIG. 1.

According to this embodiment, because the primary sodium passing the annulus portion 15 has been subjected to the heat exchanging operation by the intermediate heat exchanger 19, the temperature of the primary sodium is low (about 350° C.) in comparison with that (about 500° C.) before the heat exchanging operation. Accordingly, the electromagnetic pump 16 can be utilized in the low temperature atmosphere, so that the durability and the reliance of the electromagnetic pump 16 is improved.

Figure 7:
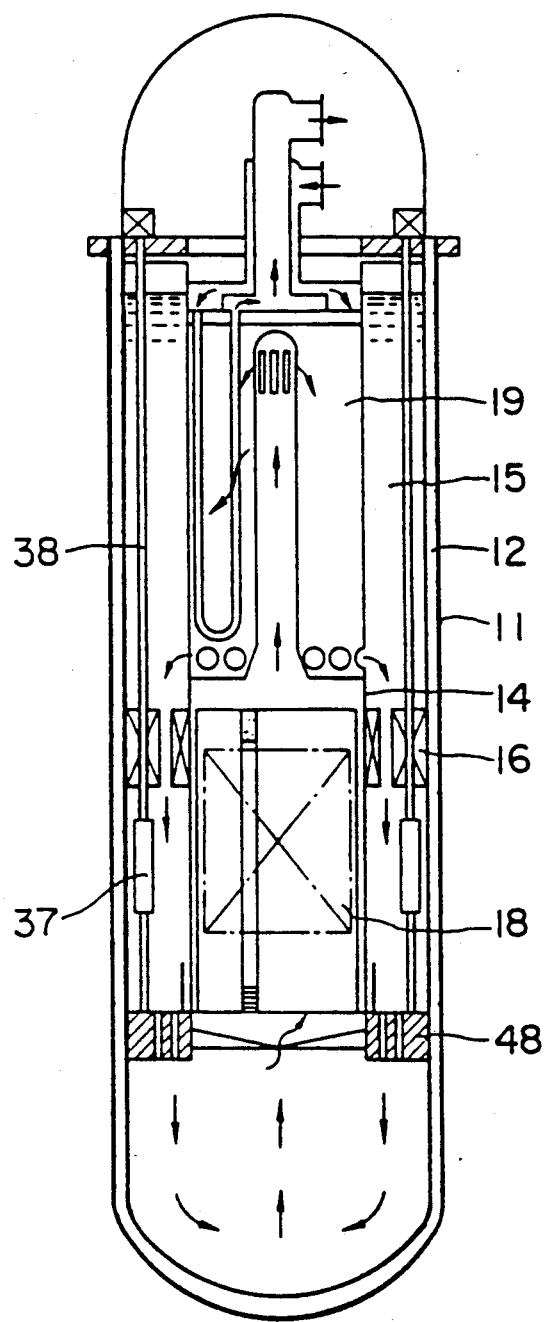

In the embodiment of FIG. 7, the reactor core 18 is disposed above the partition plate 48 as shown in FIG. 2 and the electromagnetic pump 16 is disposed in the annulus portion as shown in FIG. 6.

According to this embodiment, the durability and the reliance of the electromagnetic pump 16 can be also improved.

Figure 8:
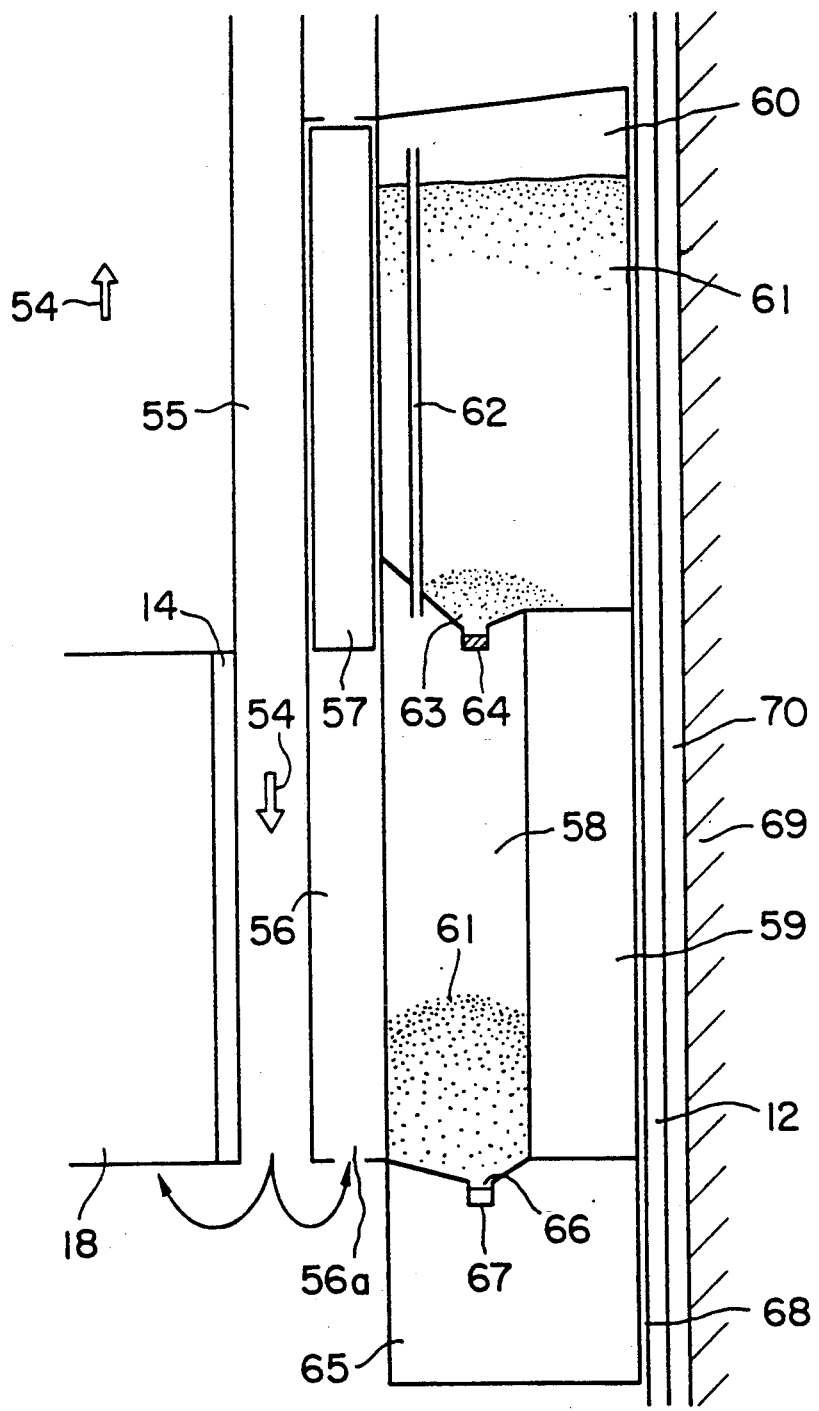
FIG. 8 is a sectional view of a part of a fast reactor according to a fourth embodiment of the present invention.

FIG. 8 is a partial sectional view of the fourth embodiment according to the present invention, in which the reactor core 18 is arranged in substantially the axial central portion in the reactor vessel (RV) 12 and supported by the suspension drum 14.

An intermediate heat exchanger, not shown, is disposed above the reactor core 18 and the primary sodium 54 heated in the reactor core 18 is subjected to the heat exchanging operation with the secondary sodium in the intermediate heat exchanger, and thereafter, the primary sodium 54 lowers in an annulus portion 55 formed in the outer peripheral area of the intermediate heat exchanger and is then guided into the reactor core 18 again.

In the outer peripheral area of the annulus portion 55, is formed a reactor shutdown rod elevation area 56, in which a float type reactor shutdown rod 57 is disposed to be vertically elevatable. The float type reactor shutdown rod 57, in the reactor shutdown period, lowers by the self-gravity in the annulus portion 55 to a lower end position, i.e. charged position, of the reactor shutdown rod elevation area 56, whereas in the operation starting period, the shutdown rod 57 is elevated, i.e. withdrawn position, in the shutdown rod elevation area 56 by primary sodium pressure caused by actuation of a primary system pump, not shown, that is, by a pressure caused by the primary sodium 54 flown into the shutdown rod elevation area 56 through a lower end opening 56a thereof.

A reflector area 58 is provided on the outer peripheral side of the reactor shutdown rod elevation area 56 at a portion corresponding to the reactor core 18, and on the outside of the reflector area 58 is disposed a neutron absorber 59 so as to suppress neutron irradiation during the whole running period of the RV 12 within the limited value range.

Above the reflector area 58 and the neutron absorber 59 is disposed a reflector storage tank 60 in which a reflector 61 composed of grains or powders is stored. A gas filling space defined in the upper portion of the storage tank 60 and a gas space defined in the upper end portion of the reflector area 58 are mutually communicated through a pressure regulating pipe 62 to maintain pressure in both the spaces always equal.

The storage tank 60 is provided with an opening 63 which is formed at a lower end thereof, i.e. an upper portion of the reflector area 58, and closed by a plug 64 formed of a material such as aluminum, antimony or barium having a lower melting point. The reflector 61 in form of grains or powders continuously falls down by self-gravity into the reflector area 58 through the opening 63 by fusing the plug 64 by means of an electric heating element, not shown, arranged in the RV 12.

The reflector 61 is composed of a material having a high neutron reflecting ability and keeping its grain or powder state in a temperature ranging between room temperature and a high temperature such as about 700° C., and a low enrichment of $B_4C$, SiC, ZrH or TiH may be utilized as a material satisfying such conditions. The reflector 61 fallen down in the reflector area 58 can compensate for the lowering of the reactivity due to the burning of the reactor core 18, which will be described hereinlater.

A reflector recovery tank 65 is disposed below the reflector area 58 through an opening 66 formed at a lower end of this area 58. The opening 66 is closed with a plug 67 formed of a material having a low melting point and the plug 67 is fused by means of an electric heating element, not shown, whereby the grains or powders constituting the reflector 61 fall down into the recovery tank 65 by the self-gravity thereof.

A primary sodium flow passage 68 is formed around the inner periphery of the RV 12, and an air space, i.e. layer, 70 is defined at the outer periphery of the RV 12 between it and a concrete wall 69. Accordingly, in an accident, the primary sodium 55 passing the primary sodium passage 68 is cooled by the air in the air layer 70 during the passing therethrough.

The fourth embodiment operates as follows.

At an operation starting time of a nuclear reactor, the primary system pump, not shown, is first actuated to feed the primary sodium 54 to the lower portion of the reactor core 18 through the annulus portion 55. As shown by arrows in FIG. 8, a part of the primary sodium 54 flows into the reactor shutdown rod elevation are 56 through the lower end opening 56a and the float type shutdown rod 57 is hence elevated by this flowing pressure in this area 56 to thereby take the fully withdrawn position of the reactor shutdown rod 57.

Then, the plug 64 closing the outlet opening 63 of the reflector storage tank 60 is fused by the electric heating and hence opened, thereby to cause the reflector 61 to continuously fall down and into the reflector area 58 during the reactor running period. The reflector storage tank 60 will become empty at the reactor operation final stage.

In the present embodiment, an amount of the reflector 61 to fall down per unit time is decided, in a view point of reactivity, so as to accord with the reactivity which is lowered in accordance with the burning of the reactor core 18, and accordingly, this reactivity lowering may be compensated for the amount of the reflector 61 in the reflector area 58. The nuclear reactor can thus be operated with constant power without carrying out any mechanical procedure during the whole running cycle.

In actual operation, a plurality of reflector storage tanks 60 are arranged in correspondence to the number of reactor operations assumed in a lifetime of a power plant. That is, the reflector storage tanks 60 all coincident in the number of locations with the operation times or several times thereof and during the reactor running cycle, one or a plurality of reflector storage tanks 60 are used in consideration of the power of the reactor, the location of the reflector area 58, the neutron irradiation amount in the reactor vessel 12 and so on.

In such a case, the amount of the reflector 61 falling down into the reflector area 58 is decided in accordance with the degree of lowering of the reactivity of the reactor core 18 due to the burning during one running cycle. For example, in the case of the core reactivity lowering degree being of about 1% $\Delta K/KK'$, the amount of the reflector 61 is required to fall is about 150 kg in the case of using an elongated type small reactor core with $B_4C$ (100%B).

As described above, when the storage tank 60 becomes empty after the one running cycle, the primary system pump stops, whereby the float type reactor shutdown rod 57 falls down by its self-gravity to the rod charged condition, then the nuclear reactor stops.

Accordingly, the nuclear reactor can thus be operated with constant power without carrying out any mechanical procedure during the whole running cycle by dropping the reflector 61 into the reflector area 58 in response to the running operation of the nuclear reactor.

Figure 9:
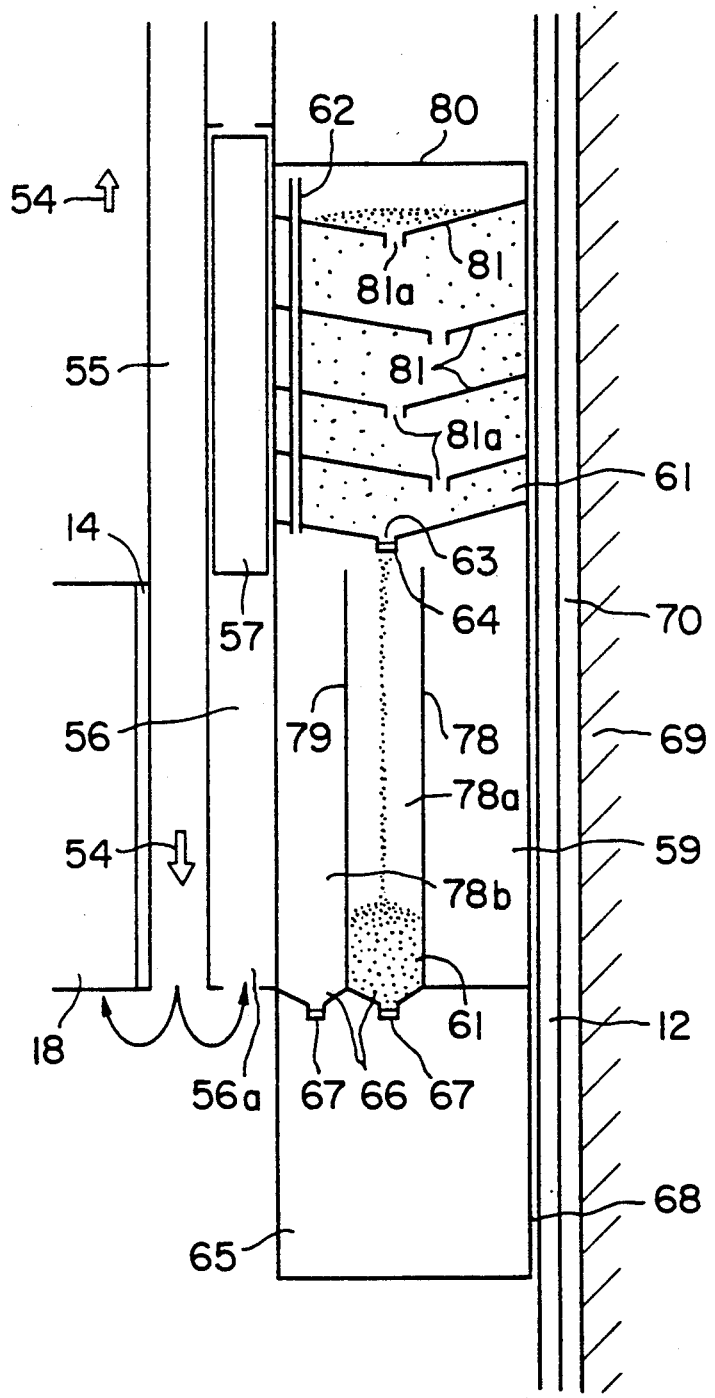
FIG. 9 is also a sectional view of a part of a fast reactor according to a fifth embodiment of the present invention.

FIG. 9 represents the fifth embodiment according to the present invention, in which a reflector area 78 and a reflector storage tank 80 are employed instead of the reflector 61 and the reflector storage tank 60 of the aforementioned fourth embodiment.

In this fifth embodiment, the reflector are 78 is divided into outer and inner sections 78a and 78b, and the reflector 78 falls down from the storage tank 80 by its self-gravity first falls into the outer section 78a and then into the inner section 78b after filling up the outer section 78a over an upper end of a partition plate 79.

The outer and inner sections 78a and 78b of the reflector area 78 are provided with lower end openings 66 which are closed by plugs 67.

The reflector storage tank 80 is located above the reflector area 78 and the neutron absorber 50 with an outlet opening 63 to be closed by a plug 64 being positioned above the outer section 78a. The interior of the reflector storage tank 80 is divided into a plurality of vertical sections by a plurality of partition plates 81 respectively provided with openings 81a being shifted with each other in location. According to this structure, the rapid falling down of the reflector 78 from the storage tank 80 can be prevented even if the outlet opening 63 of the storage tank 80 is broken by any accident. In addition, since the reflector area 78 is divided into two sections 78a and 78b by the partition plate 79, the reflector area 78 can be prevented from being rapidly filled up with the reflector 61 by any reason.

The other structure and the functions of this fifth embodiment are substantially identical to those of the fourth embodiment.

Figure 10:
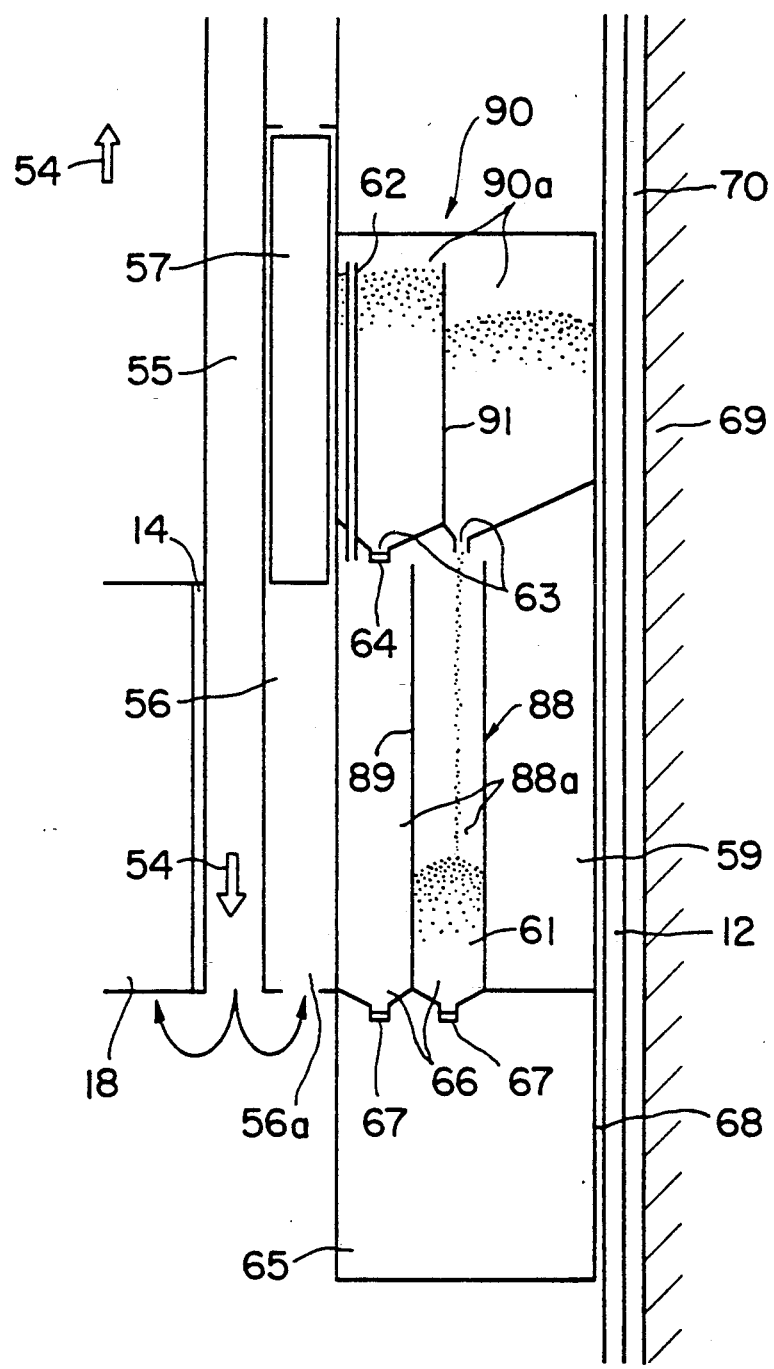
FIG. 10 is also a sectional view of a part of a fast reactor according to a sixth embodiment of the present invention.
Figure 11:
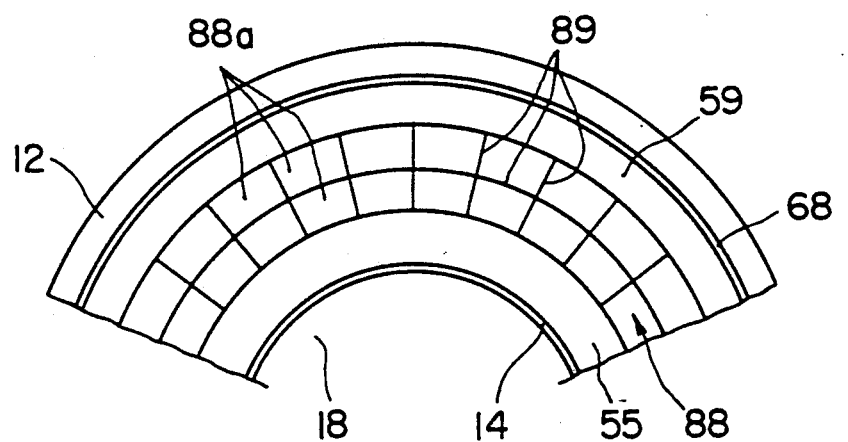
FIG. 11 is a horizontal sectional view of the embodiment of FIG. 6 showing a structure of a reflector area.

FIGS. 10 and 11 represent the sixth embodiment according to the present invention, in which a reflector area 88 and a reflector storage tank 90 are substituted for the reflector 58 and the reflector storage tank 60 of the fourth embodiment.

In this sixth embodiment, the reflector area 88 is divided into small sections in its radial and circumferential directions, each section being provided at its lower end with an opening 66 closed by a plug 67.

The interior of the reflector storage tank 90 is also divided into a plurality of sections 90a corresponding to the small sections of the reflector area 88 by a partition plate 91, each section being provided at its lower end with an outlet opening 63 closed with a plug 64. These outlet openings 63 are successively opened from the outside one in the circumferential direction, and after the outside openings 63 have been opened, the openings 63 on the inside are then successively opened in the circumferential direction.

The other structures or arrangement is substantially identical to that of the fourth embodiment, and accordingly, the function thereof is also identical.

As described above, since the respective small sections of the reflector area 88 are filled up with the reflector 61, the neutron irradiation amount can be uniformly reduced. Further, even if the outlet openings 63 are broken by any accident, the rapid falling of the reflector 61 from the storage tank 90 is prevented, and it may be possible not to make the maximum reactivity more than 1$. For example, in a case where there is an excess reactivity of 30$ (about 10% ΔK) during the initial burning stage of a running cycle of ten years, the insertion reactivity can be made less than 1$ by dividing the reflector area 88 into small sections, for example, more than 30 sections, even if one small section 88a is rapidly filled up with the reflector 61.

As described, according to the fourth to sixth embodiment of the present invention, the reflector in the form of grains or powders continuously falls down by self-gravity into the reflector area so as to be coincident with the lowering of the reactivity due to the burning of the reactor core to compensate for this reactivity lowering, so that the power of the nuclear plant can be maintained constant without utilizing any mechanical operation during the whole running period thereof.

Moreover, since the float type shutdown rod is elevated by the actuation of the primary system pump and the reactor starts its operation with the shutdown rod being fully withdrawn, there is not need for arranging control rods in the reactor core, resulting in compact structure of the reactor core.

The lowering of the reactivity due to the burning of the reactor core can be compensated for by continuous gravity falling of the reflector in form of grains or powders into the reflector area, thus operating the reactor with constant power without any mechanical operation.

In addition, the shutdown of the reactor is performed by the gravity falling insertion of the float type shutdown rod in response to the operation stop of the primary system pump, thus ensuring easy and precise operation.

Figure 12:
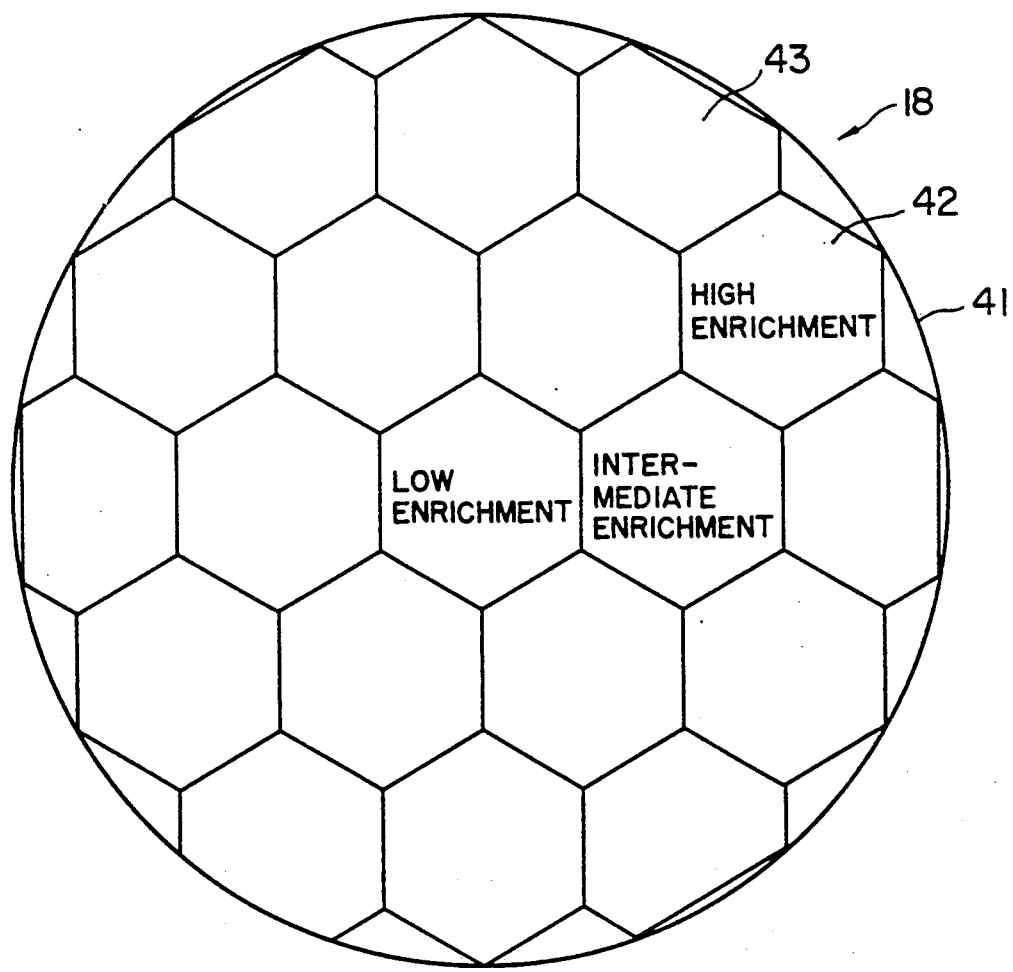
FIG. 12 is a horizontal sectional view of one example of a reactor core structure.

FIG. 12 is an illustration of a horizontal cross section of the reactor core 18 comprising a core barrel 41 in which a plurality of fuel assemblies 42 of normal shape and fuel assemblies 43 of a specific shape are arranged and sodium is utilized as a coolant. To this reactor core 18, distribution in enrichment of the fuel assemblies in the radial direction is provided to make flat the power distribution of the fuel assemblies in the radial direction, to increase the neutron leakage in the radial direction, to increase the reflector controlling performance and to increase the neutron leakage from the whole structure of the reactor core. That is, the fuel assemblies are arranged in the barrel 41 so that the central one has a low enrichment, ones surrounding the central one have an intermediate enrichment and ones disposed outside have a high enrichment.

Figure 13:
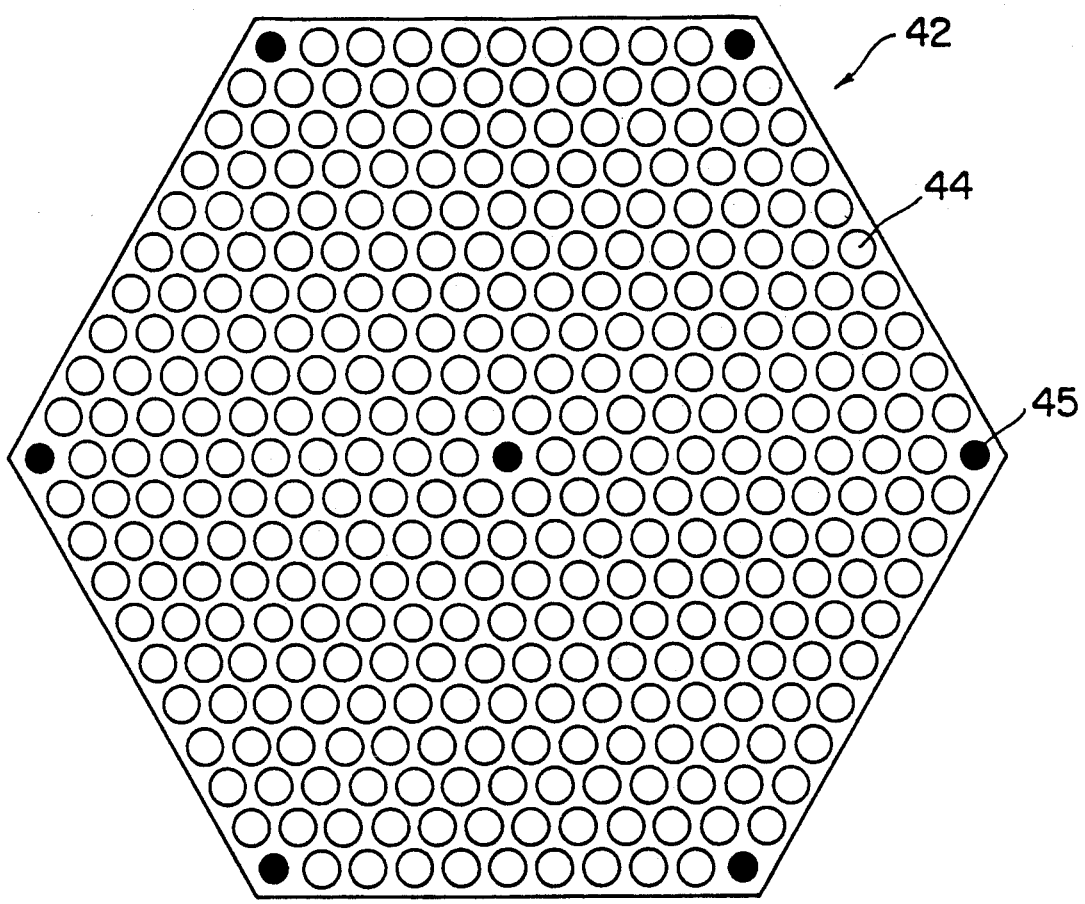
FIG. 13 is a horizontal section of a structure of a fuel assembly.
Figure 14:
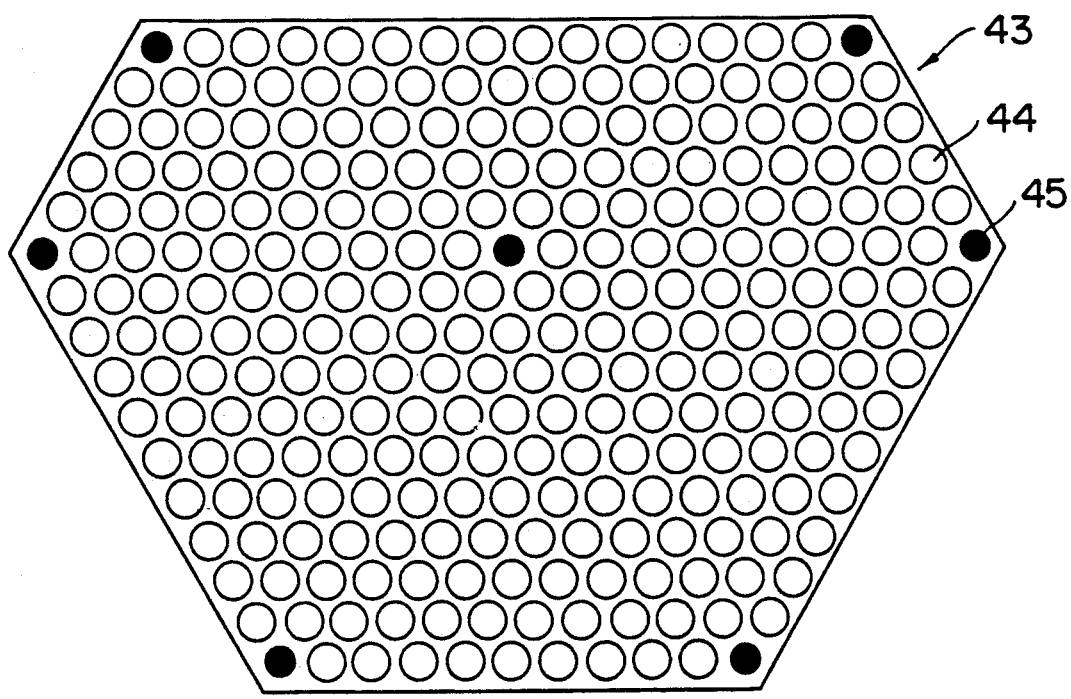
FIG. 14 is a horizontal section of a specific structure of a fuel assembly.

The respective fuel assemblies 42 and 43 are composed of fuel pins 44 and tie rods 45, respectively, as shown in FIGS. 13 and 14. The fuel assemblies 42 and 43 include no duct, i.e. duct-less fuel assemblies, for the purposes of increasing the control performance for the reflector and reducing the void reactivity of the coolant. According to the reactor design, it may be possible to construct a fuel assembly having a duct, and such a design may be applied to an example in which the fuel assembly having a hexagon shape as shown in FIG. 13 is provided with a duct and the deformed fuel assembly such as shown in FIG. 14 has no duct.

In the following description, the selection of basic parameters will be described that are important for reference mode setting for the reactor core design for making "zero" the void reactivity of the coolant at the core portion in consideration of the improvements in economy and safety.

Figure 15:
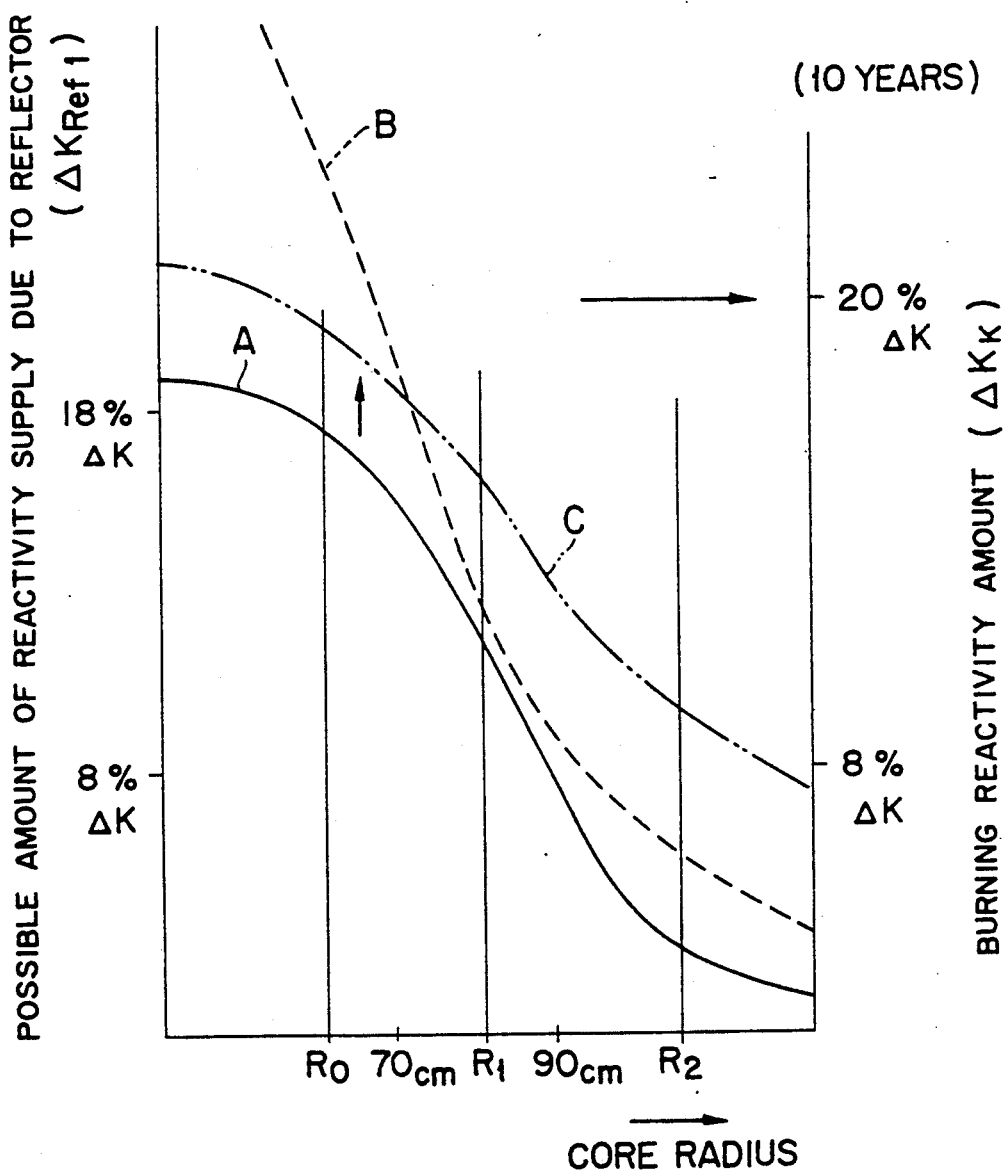
FIG. 15 is a graph representing relationships between a reactor core radius, a supply reactivity due to the reflector and burning reactivity in a columnar reactor core.

FIG. 15 represents a relationship between a possible amount of a reactivity supply and a burning reactivity amount due to a reflector versus reactor core radius R and a reactivity lifetime with respect to a reactor having a height H and a core radius R (H/R>1).

In the graph of FIG. 15, a character A indicates a curve showing the reactivity supply due to the location of the reflector disposed outside the reactor core, a character B indicates a curve showing the possible amount of the burning reactivity due to the size of the reactor core and a character C indicates a curve showing reflector supply reactivity in the case of reducing a distance between the reflector and the reactor core.

From the view point of reactivity, for a reactor core in which reflector control is carried out, it may be said that the reactivity can be made optimum if the reduction in the reactivity due to $\Delta K_{Burn}$ burning is compensated for so that a reactivity compensation $\Delta K_{refl}$ due to the lifting of the reflector, for example, is satisfied with an equation of $$\Delta K_{refl} \approx \Delta K_{Burn} + \Delta K \text{ temperature compensation).} \quad (1)$$

The $\Delta K_{refl}$ term represents a supply of reactivity due to the reflector disposed outside the reactor core and attains a remarkable effect or function in the case of a reactor core having a small radius R and the function is rapidly made small in the case of increasing the radius R.

Regarding the burning reactivity, as the core radius R decreases, the enrichment becomes high with power density being constant, and regarding the running cycle length, it becomes rapidly long as the core radius R decreases, whereas as the core radius R increases, the enrichment becomes low and the running cycle length becomes small.

In the case of constant power, the power density is reduced, and as the reactor core R increases, the burning reactivity is reduced. Accordingly, the reactivity can be made optimum so as to satisfy the equation (1) using curves A and B and the void reactivity of the coolant.

From the view points mentioned above, it may be said that the lower limit of the reactor radius R is mainly decided by a designable goal lifetime and the upper limit thereof is mainly decided by criticality requirements of a "naked reactor core" and the reactivity supply amount due to the reflector.

The distance between the reactor core and the reflector and a range covered by the reflector constitute important parameters for the reactivity adjustable amount due to the location of the reflector, and according to the present embodiments, the range covers the whole circumferential direction.

The increasing of the reactor core radius R can effectively reduce the neutron leakage from the reactor core per unit core power and is effective for reactivity lifetime elongation due to the burning reactivity reduction.

The principle design relating to the core radius R is decided from the above facts, and from fuel bulking as the fuel reference mode, as will be explained. The fuel bulking is related to a goal performance (to make "zero" the void coefficient) with respect to the coolant void reactivity.

Figure 16:
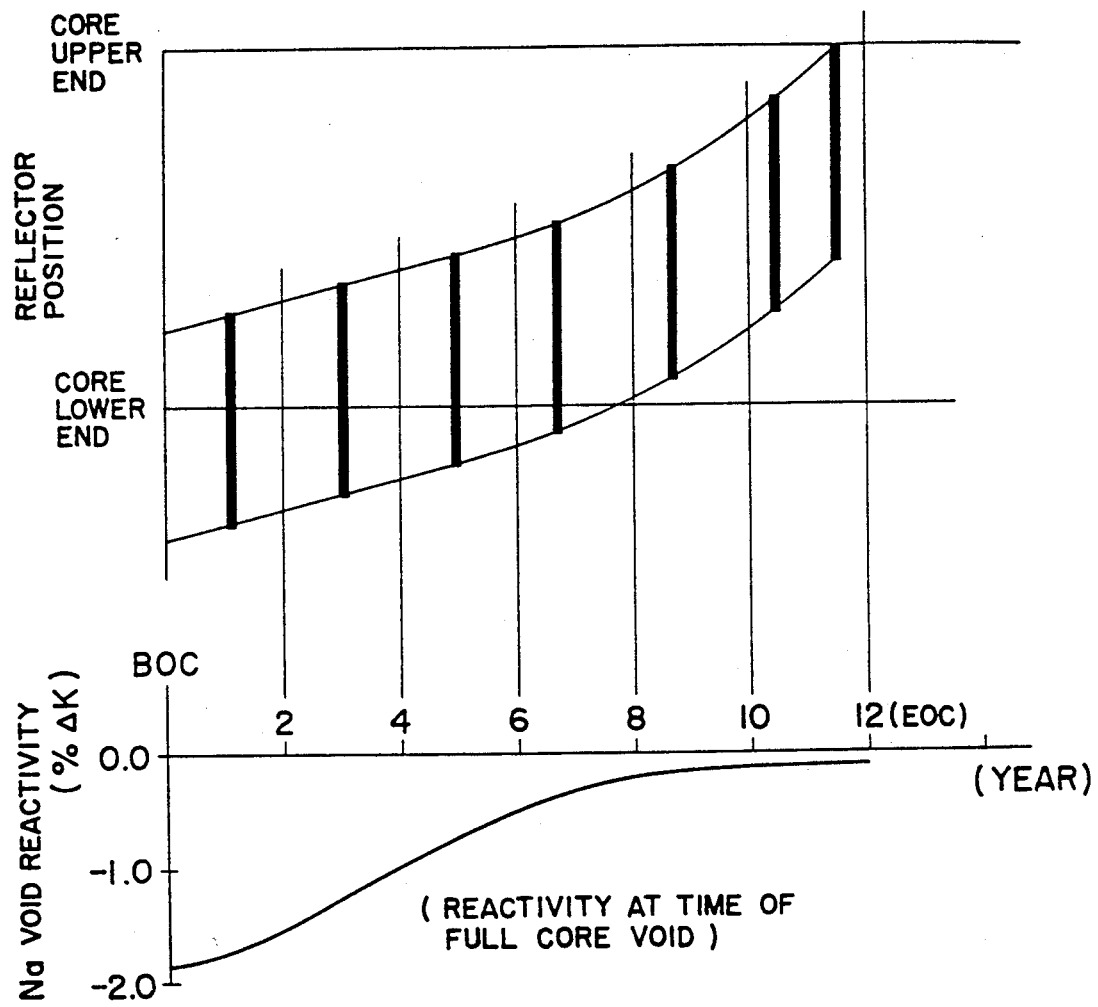
FIG. 16 is a graph representing a relationship between a positional displacement of a burning control reflector and an Na void coefficient.

FIG. 16 is a graph showing a relationship between an approximate axial level of the controlling reflector during the reactor running cycle and the void coefficient in the reactor lifetime.

Referring to FIG. 16, in the initial running stage in which the burning does not so progress, the reflector is less overlapped with the fuel portion of the reactor core, but as the burning progresses, the reflector is much overlapped with the fuel portion of the reactor core for compensating for the reactivity. In the example of FIG. 16 (reactor core power: 125 MWt), the reflector is completely overlapped with the reactor core after about 8 years running cycle of the reactor, and within the running cycle of 8 to 12 years, the vertical length of the reflector is included in the height range of the reactor core.

Figure 17:
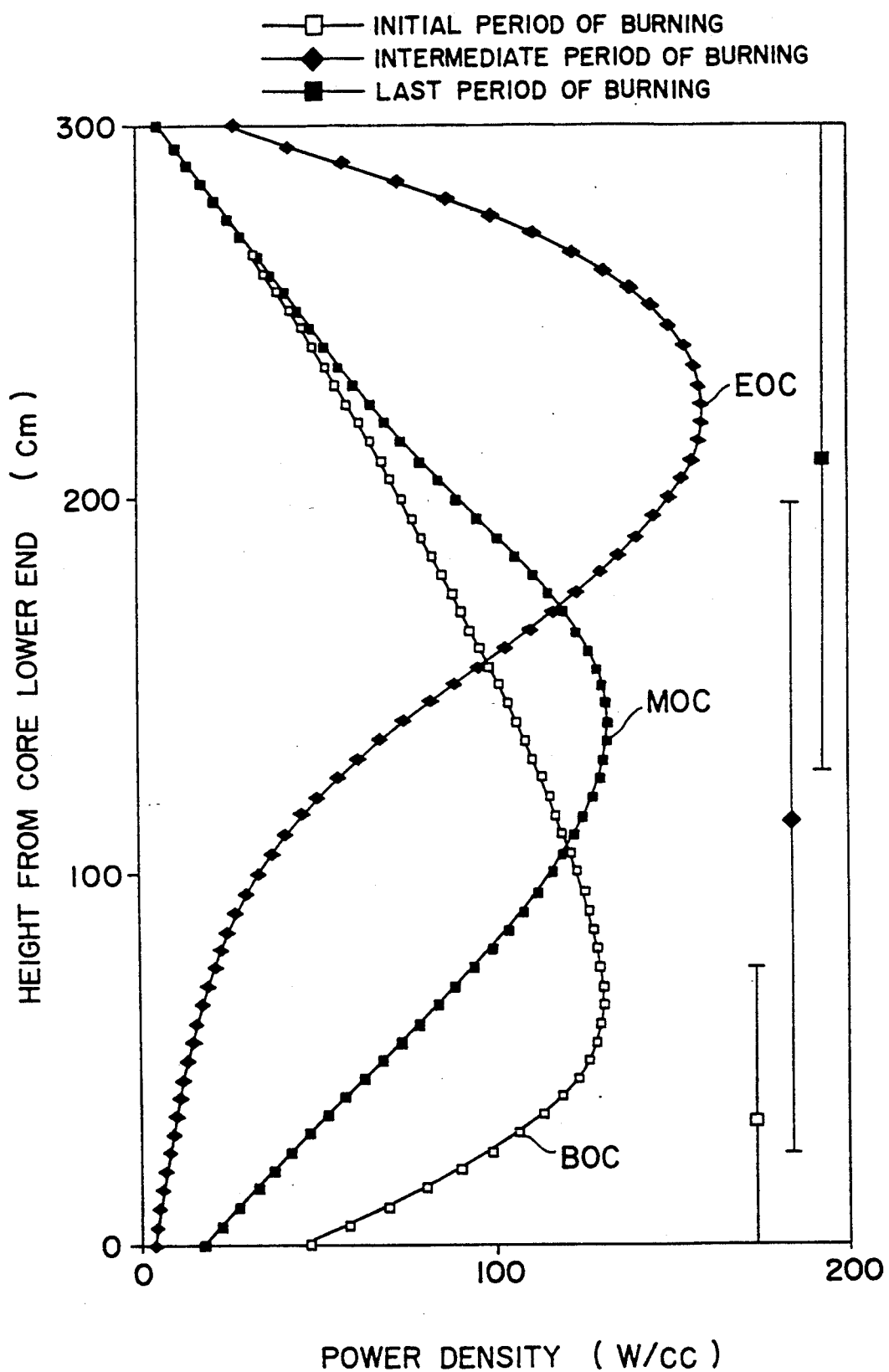
FIG. 17 is a graph showing axial power distribution at initial, intermediate and final burning stages of the reactor core.

FIG. 17 is a graph showing an axial power distribution of the central axis of the reactor core to indicate the relationship between the vertical movement of the reflector and the burning condition of the reactor core. In FIG. 17, curves BOC, MOC and EOC represent cases of an initial burning stage (beginning of cycle), an intermediate burning stage (middle of cycle) and a final burning stage (end of cycle), respectively.

As can be seen from FIG. 17, it will be understood that the axial power peak is changed in the axial direction of the reactor core in accordance with the vertical movement of the reflector. Since this peak value accords with the peak position of the distribution of neutron flux for maintaining nuclear fission, the axial range of the reactor core with which the reflector is overlapped constitutes the substantive reactor core portion. Further, as shown by the power distribution of FIG. 17, in the initial stage of much fuel inventory, even the area not covered by the reflector is endowed with a relatively large power distribution. This means, in consideration of the neutron leakage in the axial direction, that many neutrons leak from a portion of the reactor core not overlapped with the reflector, and as shown at the lower stage of FIG. 16 representing the void reactivity, the void reactivity has a large negative value in the initial stage of the burning.

In the intermediate burning stage in which the reflector is widely overlapped with the reactor core portion, the effective reactor core portion is substantially coincident with a portion overlapped with the reflector. In such a case, the increasing of the radial reflecting effect results in the reduction of the neutron leakage in the radial direction, which will be understood from the comparison of the curve BOC with the curve MOC of FIG. 17.

In the final burning stage in which the reflector is moved to the upper portion of the reactor core, the void reactivity becomes substantially maximum as shown in FIG. 16. Namely, in the final burning stage in which the burning further progresses, reactivity recovery due to the reflector is the most important factor, so that the length of the reflector has a significant affect on the elongation of the reactivity lifetime. The void reactivity shown in FIG. 16 also increases in the final burning stage in comparison with the initial burning stage for the reason that the fission product (FP) is produced increasingly and the spectrum is hence hardened. In comparison with the intermediate burning stage, the void coefficients in the intermediate and final burning stages are substantially coincident with each other in spite of the fact that the power distribution in the final burning stage is made slightly sharp in comparison with the intermediate burning stage. The length of the reflector is related to "not-positive" void reactivity in the final burning stage. Accordingly, the length of the movable reflector after positioning the reflector constitutes an important matter as the basic mode of the reactor core with respect to reactor core reactivity lifetime and the void reactivity.

It will be described hereunder how to make optimum the length of the reflector in the elongated reactor core utilizing plutonium in which the void reactivity is made "not-positive". In this stage, however, the fuel bulking related to the decision of the reactor core radius R will be first described from the point of the void reactivity.

Figure 18:
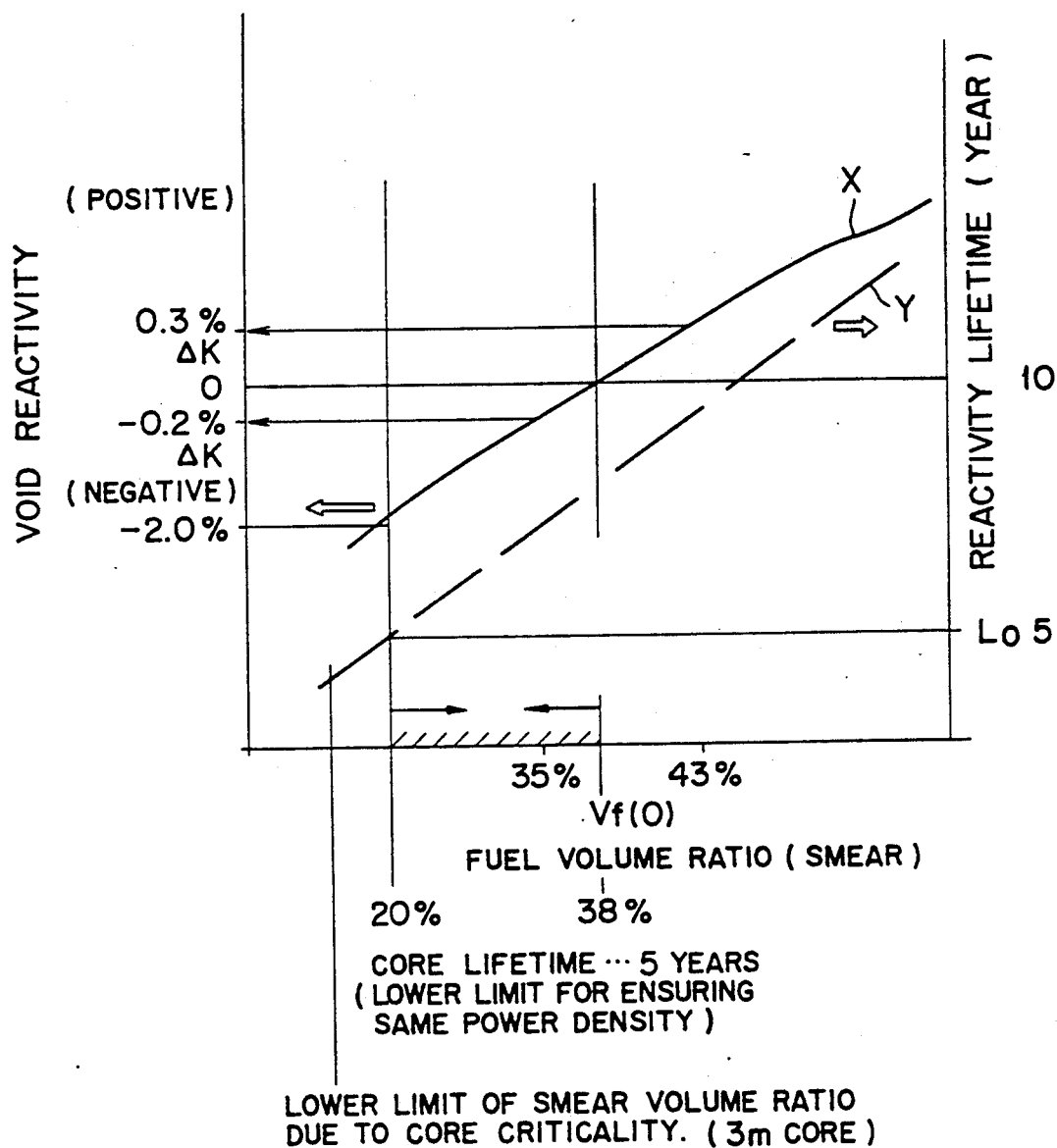
FIG. 18 is a graph representing relationships between fuel volume ratio, void reactivity and reactivity lifetime.

FIG. 18 shows the relationship between the reactor core void coefficient and the fuel volume ratio (smear) during the final burning stage in which the reactor core has a core diameter D of about 92 cm and a height H of about 3 m and the reflector has an effective length L of about 1.7 m. In FIG. 18, a curve X represents the relationship between the fuel volume ratio and the void coefficient and a curve Y represents the relationship between the fuel volume ratio and the reactivity lifetime. The smear fuel volume ratio is a value defined by an equation $$\pi \cdot r_1^2 \cdot N/S \qquad (2)$$

in which $r_1$ denotes an inner radius of the pin, N is the number of the pins and S denotes a cross section of the reactor core. A fuel of the effective smear density $P_i$ is charged within a range having the radius $r_i$.

In the case of a large fuel volume ratio, fuel meat having a high density is increased, so that the mean free path is made small and the leakage in the radial direction can be reduced, thus the void reactivity is made positive. However, in this example, in which the fuel volume ratio is about 35%, the void coefficient is made "not-positive". In order to elongate the reactor reactivity lifetime, it is better to have a large fuel volume ratio, whereas in order to reduce the void reactivity, it will be assumed that the upper limit the smear fuel volume ratio is of about 35%.

Figure 19:
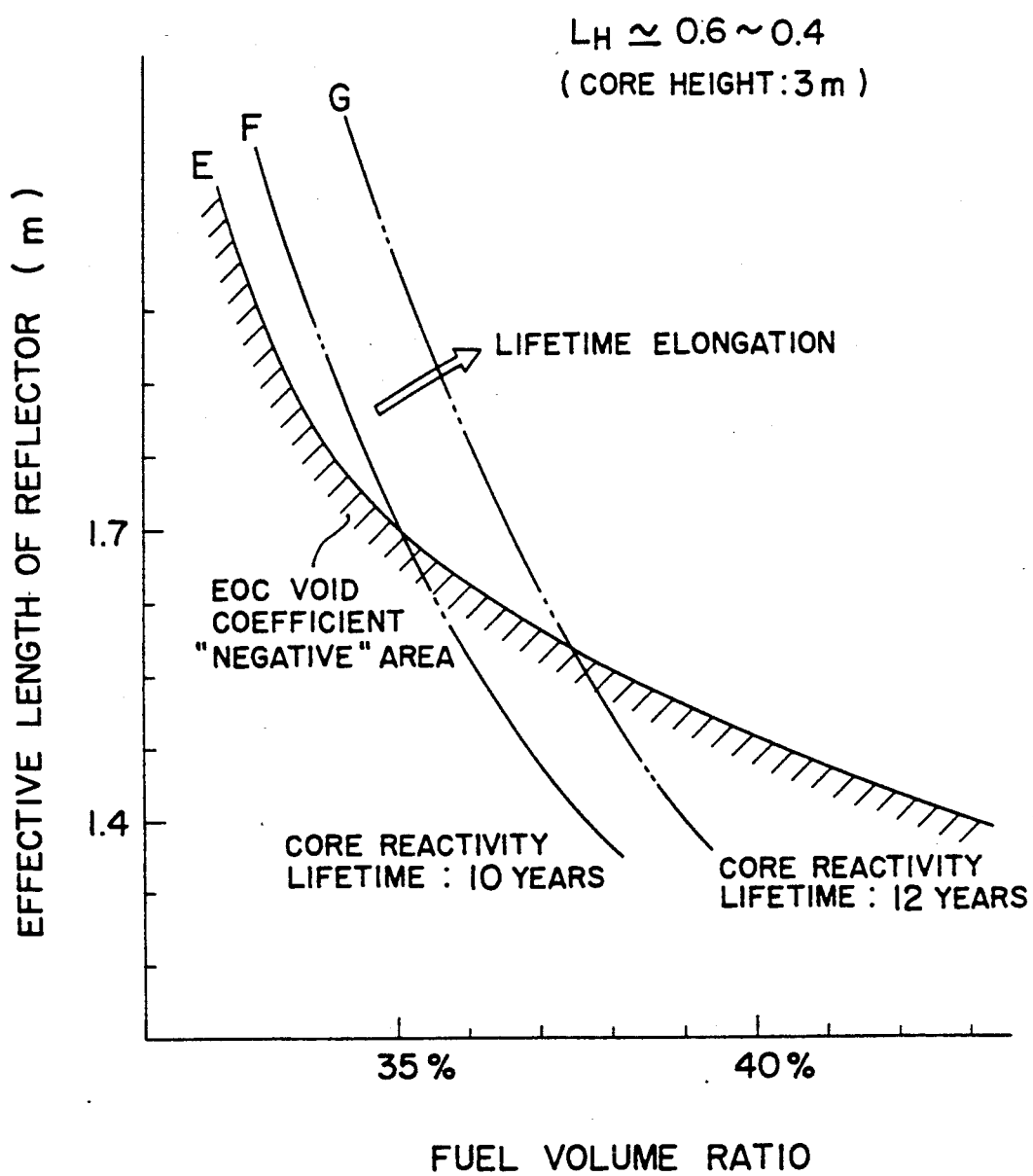
FIG. 19 is a graph representing relationships between reflector effective length, fuel volume ratio, zero-void area and reactivity lifetime elongation.

In a result of survey analysis of the present embodiment, FIG. 19 shows a range for achieving the reactor core void (lifetime final stage EOC) reactivity to "zero" with respect to the reflector length and the fuel volume ratio (smear) and for achieving elongation of the reactor core reactivity lifetime. In FIG. 19, a curve E shows a range in which the void reactivity is made "zero", a curve F shows the reactivity lifetime of 10 years and a curve G shows the reactivity lifetime of 12 years.

In the case of the large fuel volume ratio, in order to make "zero" the void reactivity in the lifetime, it will be necessary to make short the reflector length to increase the axial leakage of the neutrons. While, in order to increase the reactivity lifetime, it is effective to increase the length of the reflector. Accordingly, it will be necessary to define the range to a range achieving these conditions. In the present embodiment, in this point of view, the fuel volume ratio is selected to about 35% and the ratio of the reflector length to the reactor core length is selected to about 0.6%.

Figure 20:
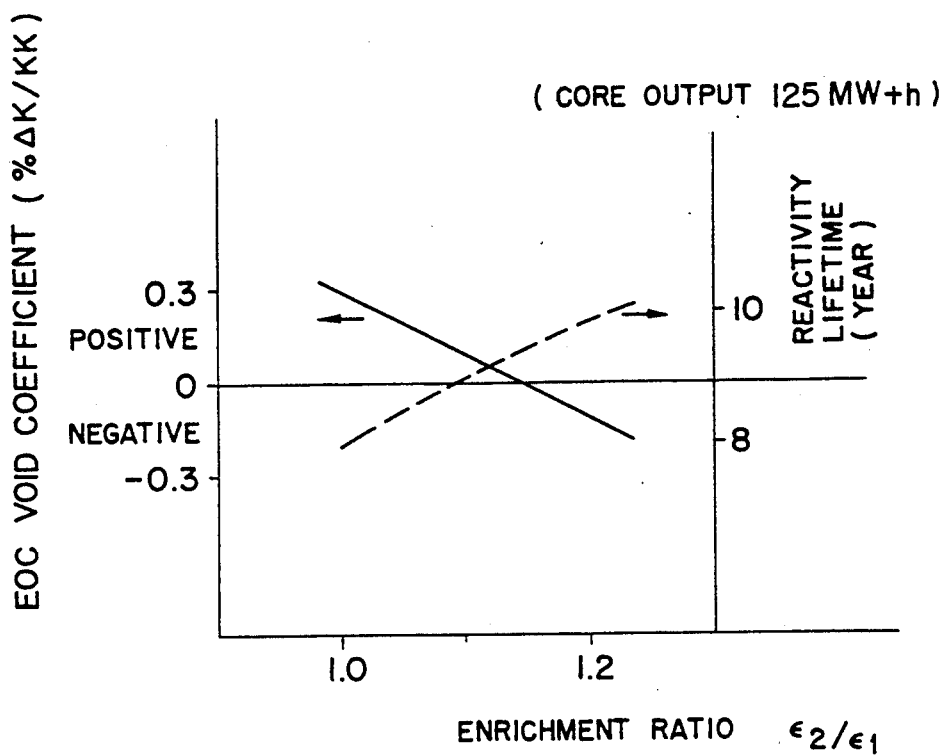
FIG. 20 is a graph representing a relationship between axial enrichment and void coefficient.

FIG. 20 shows effects for the radial distribution of the fuel enrichment as shown in FIG. 12, the void reactivity reduction and survey result of the reactivity lifetime.

Referring to FIG. 20, the reactivity supply effect due to the location of the reflector can be increased by making high the enrichment of the fuel disposed near the reflector, and it is found out that this is achieved within the range ensuring the subcriticality of a "naked reactor core" in the initial burning stage. Regarding the void reactivity, in the inside area of the reactor core, the component making negative the void coefficient due to the leakage of the neutron is decreased, whereas in the outside area in which the enrichment is made high, the component of the outward leakage of the neutron is increased, and as a whole, the void reactivity in the final burning stage is reduced. As shown in FIG. 20, in case of slightly positive void reactivity in a case where the initial enrichment is made uniform in the radial direction, the void reactivity is made negative in case of the enrichment ratio (outside enrichment $\epsilon_2$/inside enrichment $\epsilon_1$) being about 1.2.

Generally, the technique of making flat this power distribution results in a tendency to shift the void reactivity to the positive side, but as described above, it is difficult for a general flat type reactor core (H/D<1) to achieve both the elongation of the reactivity lifetime and the reduction of the void reactivity. As shown in FIG. 20, both these effects can be achieved specifically for a small size reactor core.

Figure 21:
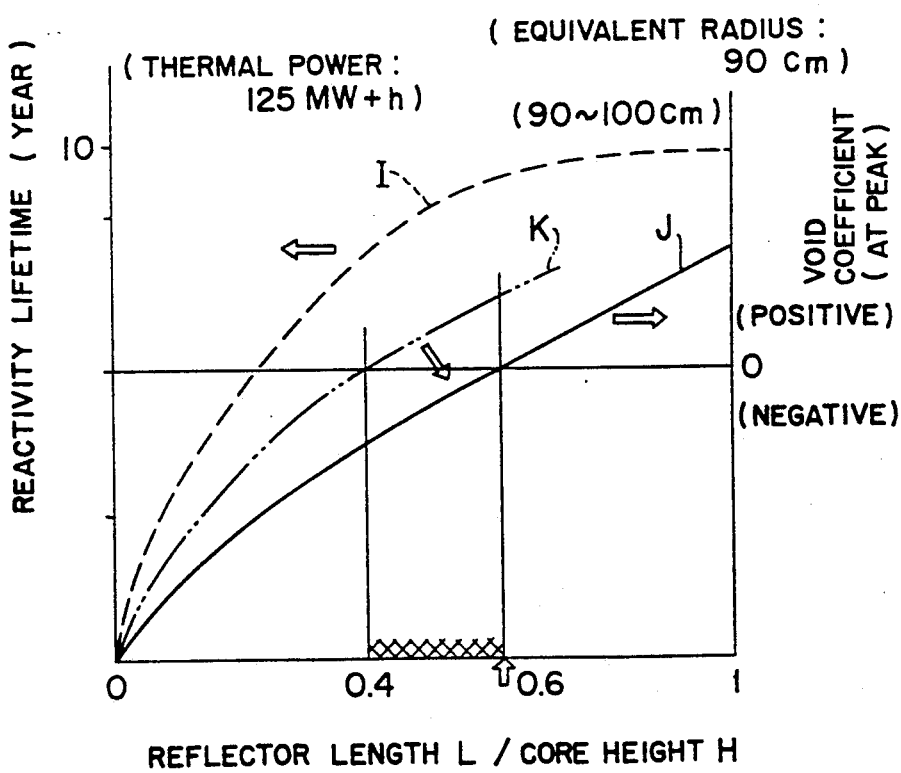
FIG. 21 is a graph representing a relationship between the void reactivity and a ratio of reflector length L to reactor core height H.

The graph of FIG. 21 shows the relationship between the length of the reflector and the reactivity lifetime in which the height of the reactor core is changed to about 6m from 3m for increasing the reactor power and the reactivity lifetime. Referring to FIG. 21, a curve I shows the reactivity lifetime with respect to a reactor having a height of 3 m, a curve J shows the ratio L/H of the reactor having the height of 3 m and a curve K shows the ratio L/H of the reactor having the height of 6 m, respectively.

In the case of the same power, it was found that the reactivity lifetime is substantially increased twice where the radial sizes of the reactor cores and the fuel modes are made uniform. The curve I in FIG. 21 shows that these ratios were substantially the same and any additional effect was not expected in spite of the elongation of the reactor core length.

The goal of achieving "zero" void reactivity at the final burning stage is achieved within the range represented by the curve K by the elongation of the reactor core, and the ratio L/H of 0.4 to 0.6. The slight improvement of the lifetime elongation and the approaching of the ratio L/H to 0.6 could be achieved by adjusting the enrichment ratio in the radial direction of the reactor core.

Accordingly, it was found that, according to the present embodiment, the length of the reflector and the height of the reactor core are considered to be optimum in the range of 0.3 to 0.7 in consideration of the change of the thickness of the composition of the reflector.

Figure 22:
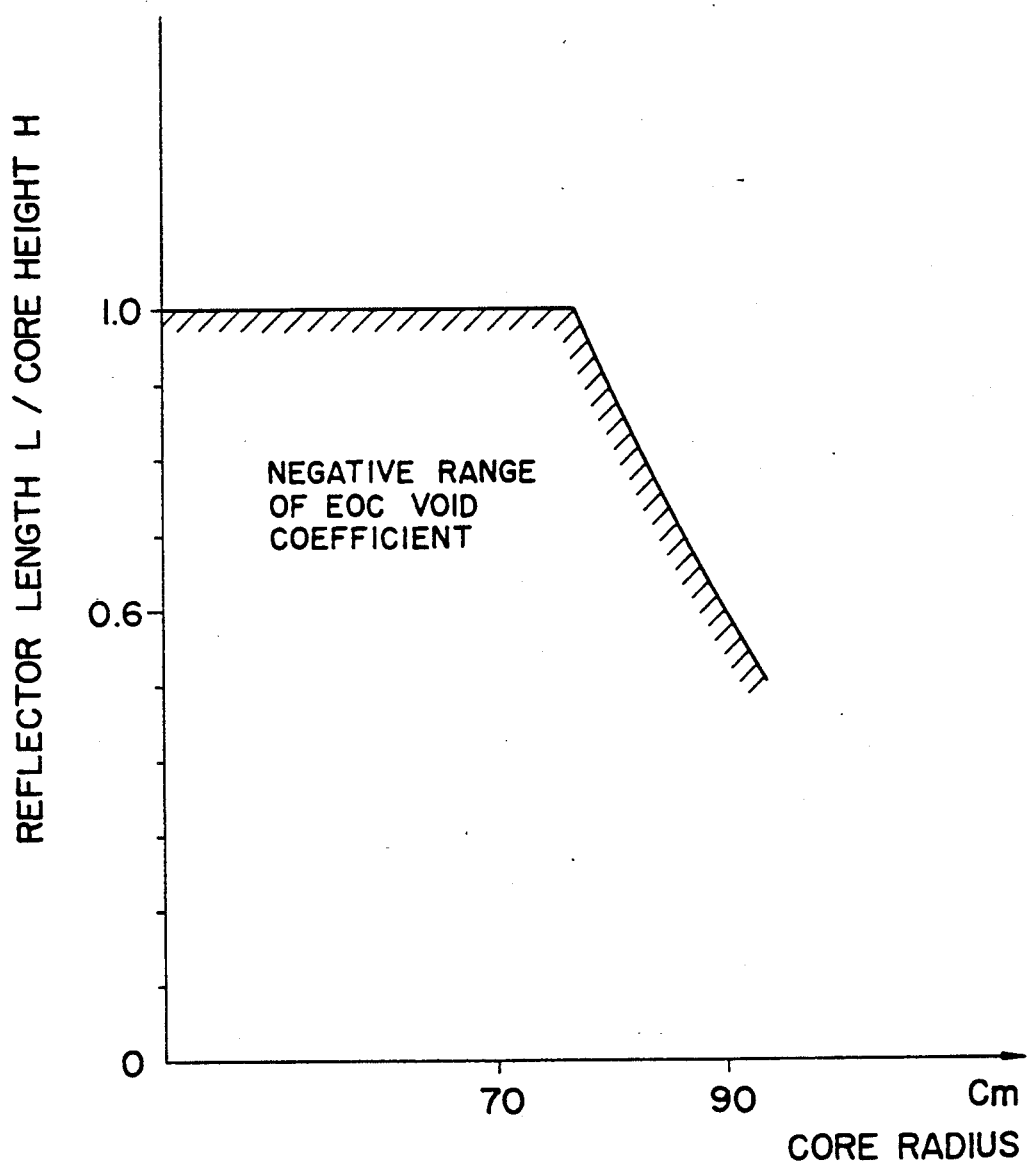
FIG. 22 is a graph representing a relationship between the reactor core radius and the ratio L/H for a "not-negative" coefficient.

As described with reference to FIG. 15, it may be said to be generally advantageous to make large the radius of the reactor core for the elongation of the reactivity lifetime. However, the reduction of the void reactivity is made effective by making small the radius of the reactor core. The relationship between the length of the reflector and the void reactivity in such a case is represented by FIG. 22. As can be seen from this FIG. 22, with a reactor having a small radius, a value of (reactivity lifetime)×(power) has a tendency to be gradually reduced under the same condition with respect to the locations of the reflector, and it is easy to make negative the void reactivity.

Figure 23:
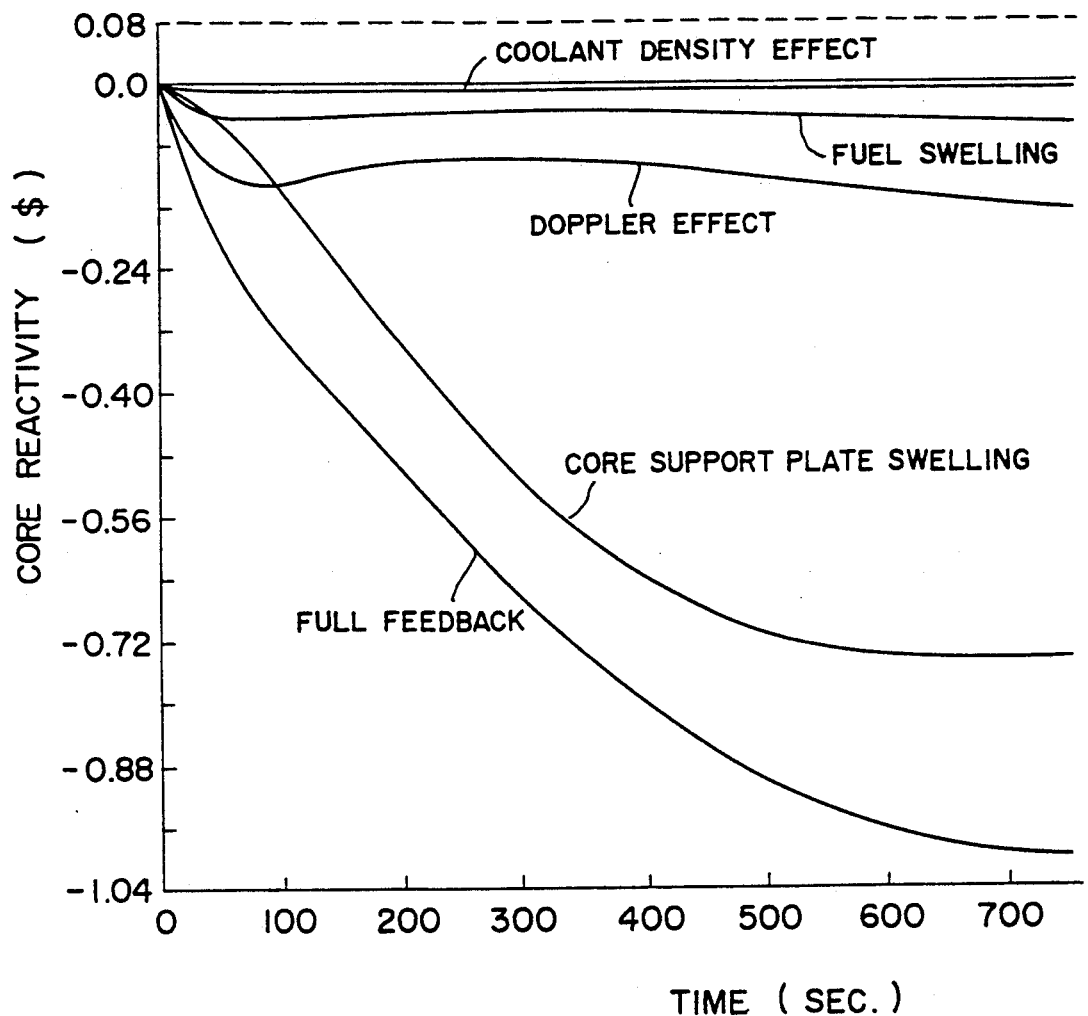
FIG. 23 is a graph showing a mode of reactivity supply in a flow rate reduction phenomenon at the final stage of a reactor core burning cycle.

In the prescription of an anticipated transient without scram (ATWS) during rated power operation of the reactor, only a negative reactivity feedback is provided even in case of an ATWS flow rate lowering type phenomenon as shown in FIG. 23 and the temperature increase of the coolant is small even in the low flow rate period, whereby the reactor can be safely shut down with the specific characteristics of the reactor.

FIGS. 24 to 29 represent another embodiment of the reactor core.

Figure 24:
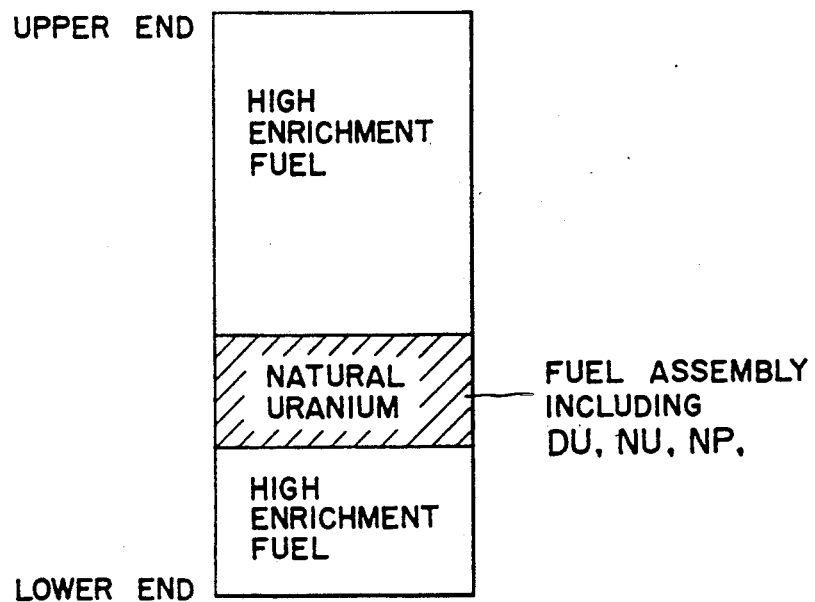
FIGS. 24 and 25 are views of other embodiments of the reactor core.

Referring to FIG. 24, in a conventional technology, the axial enrichment of the fuel was made uniform, but in the present embodiment, a natural uranium (blanket) area having a width of about 50 cm is provided with the central position being at a position apart from the lower end of the reactor core by a length of about ⅓ of the core effective length. This area may include depleted uranium (DU), natural uranium (NU) and neptunium (NP).

Figure 25:
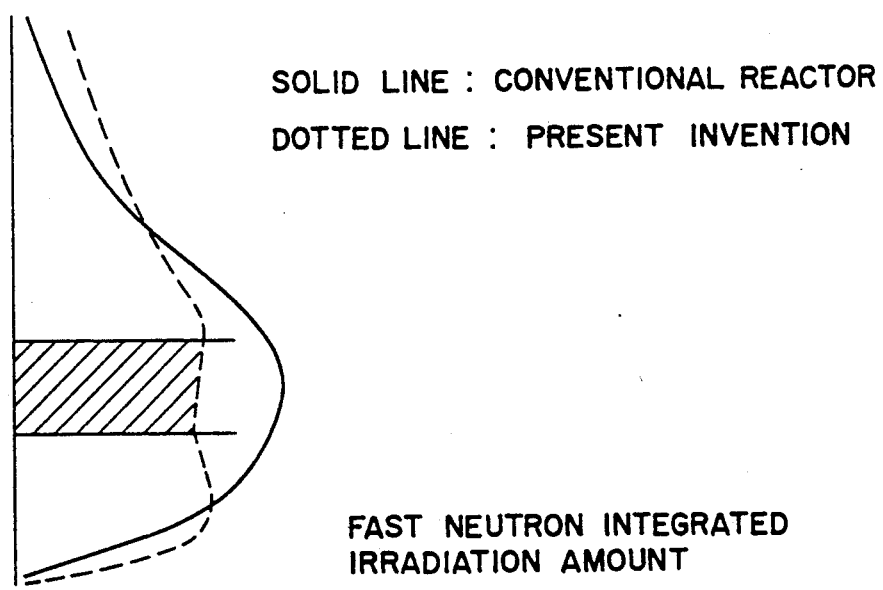

Due to the blanket area, as shown in FIG. 25, the maximum value of a fast neutron integrated irradiation amount is lowered and the reactor vessel fluence rate is hence reduced.

Figure 26:
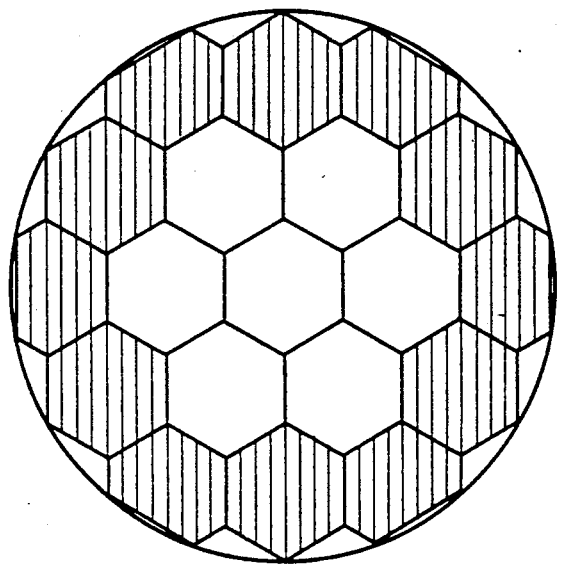
FIGS. 26 and 27 are sectional views of core arrangements of fuel assemblies provided with axial enrichment distribution.
Figure 27:
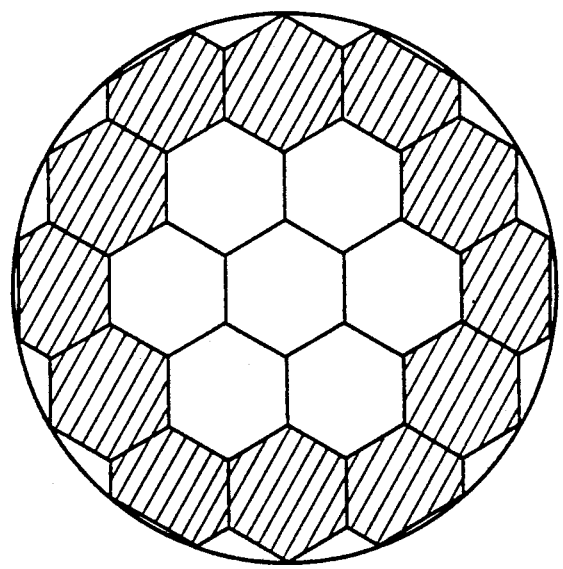
Figure 28:
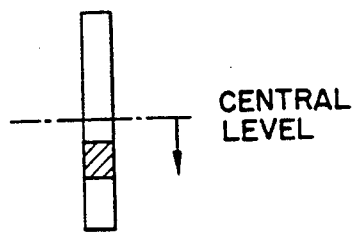
FIG. 28 is a view showing an enrichment distribution of a most peripheral fuel assembly of the reactor core of FIG. 26.

The changing of the enrichment in the axial direction will be performed by methods shown in FIGS. 26 and 27, in which, as shown in FIG. 26, only the outermost fuel assemblies near the reflector are constructed so as to each have the structure shown in FIG. 24 and, as shown in FIG. 27, the locations of the depleted uranium areas are made different in the outermost position and the inside position of the reactor core. Namely, in the case of FIG. 27, the outermost fuel assemblies are each provided with the depleted uranium area disposed below the central level as shown in FIG. 28, and the other fuel assemblies are each provided with the depleted uranium area disposed above the central level.

Figure 30:
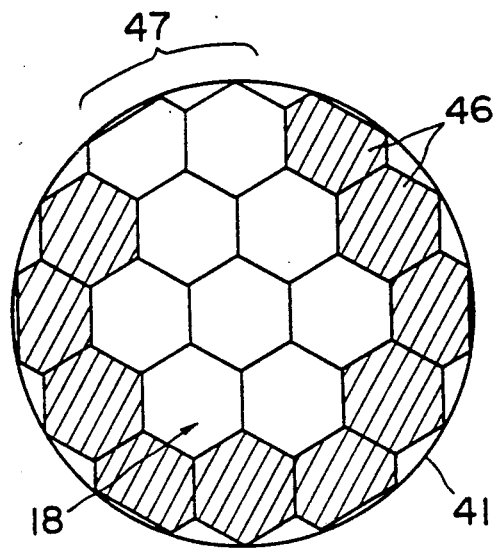
FIGS. 30 to 33 are sectional views of fuel assembly arrangements of the reactor core according to other embodiments of the present invention.
Figure 29:
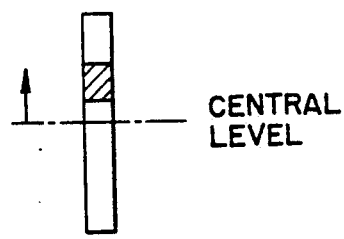
FIG. 29 is a view showing an enrichment distribution of a central fuel assembly of the reactor core of FIG. 27.
Figure 31:
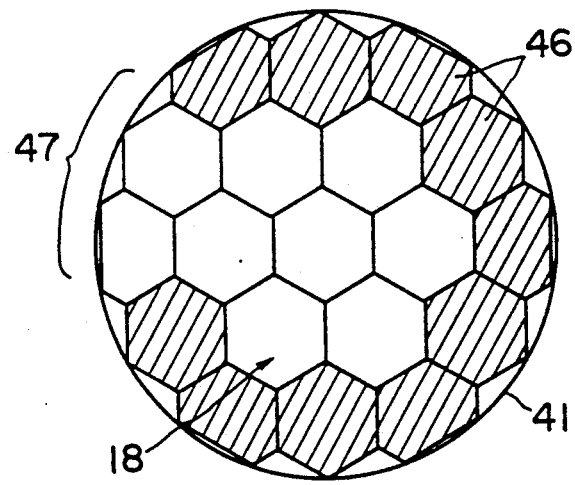
Figure 32:
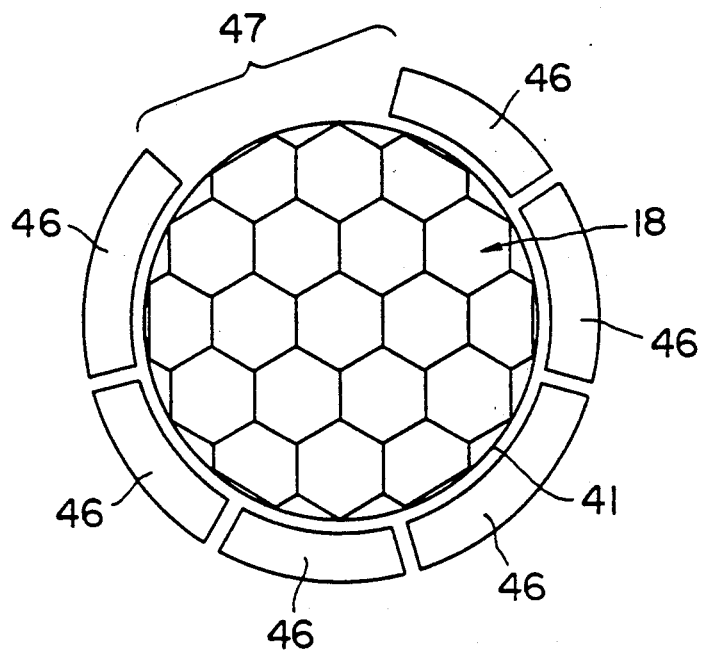
Figure 33:
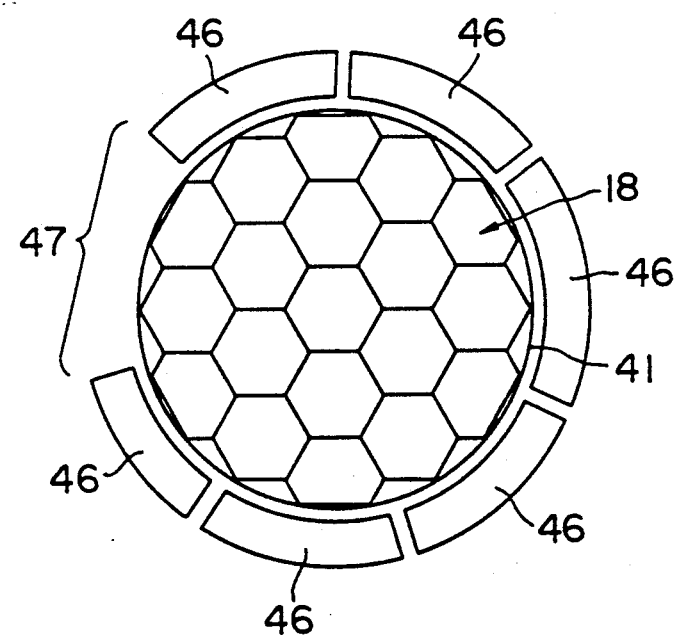

FIGS. 30 to 33 represent a further embodiment of the reactor core, in which a neutron shielding 46 is arranged in the recotor core barrel 41 as well as the reactor core 18 (FIGS. 30 and 31) or outside the reactor core barrel 41 (FIGS. 32 and 33).

The shielding 46 is disposed for the purpose of reducing the fluence rate for the reactor vessel and, as shown in FIG. 30 or 32, is provided with a partial opening 47 for the operation of the reflector disposed at an outside position corresponding to the shielding opening 47. When the fluence ratio of the opening 47 for the reactor vessel reaches to the limit value on the design thereof, the neutron shielding 46 is operated so as to change the opening 47 as shown in FIG. 31 or 33 for the next operation.

According to the structure of the reactor core described above, in a case where the elongation of the fuel is attempted by utilizing plutonium, in any burning state during the lifetime, the void reactivity is controlled so as to not be made positive, and even if the flow rate of the reactor core be lowered, natural reactor shutdown margins can be improved by the natural reactivity feedback operation of the nuclear reactor.

It is to be understood that the present invention is not limited to the described preferred embodiments and many other changes and modifications may be made within the scopes of the appended claims.

What is claimed is:

1. A fast reactor comprising:
a reactor vessel to be arranged vertically in a reactor building;
a reactor vessel upper structure disposed at an upper portion of the reactor vessel;
a drum structure suspended from the reactor vessel to substantially a central portion in the reactor vessel so as to define an annular portion between an outer periphery of the drum structure and an inner periphery of the reactor vessel;
a reactor core disposed in the drum structure;
an intermediate heat exchanger disposed at a portion above the reactor core;
a pump disposed in the reactor vessel to circulate coolant, wherein said pump includes an electromagnetic pump in said annular portion; and
a reflector disposed in the reactor vessel to be vertically movable along an outer periphery of the reactor core during reactor power operation by a single driving mechanism.

2. A fast reactor according to claim 1, further comprising a reflector driving mechanism to vertically move the reflector, a guide along which the reflector moves vertically, and a member to prevent the reflector from lowering beyond a lower limit position in the reactor vessel.

3. A fast reactor according to claim 2, further comprising an inner cylindrical member disposed between the inner periphery of the reactor vessel and the outer periphery of the drum structure to define a space between the inner periphery of the reactor vessel and an outer periphery of the cylindrical member, the space being filled up with a cover gas and the reflector driving mechanism being disposed in the space.

4. A fast reactor according to claim 1, wherein the reflector is moved vertically from a lower portion corresponding to a lower portion of the reactor core at an initial burning stage to an upper portion of the reactor core at a later burning stage.

5. A fast reactor according to claim 1, further comprising a partition which is disposed in a lower portion of the drum structure to horizontally cross an interior of the reactor vessel and on which the reactor core is mounted.

6. A fast reactor according to claim 5, wherein the partition is a partition plate provided with a plurality of perforations.

7. A fast reactor according to claim 1, wherein the pump includes an electromagnetic pump disposed below the reactor core.

8. A fast reactor according to claim 1, wherein the pump includes an electromagnetic pump disposed above the reactor core.

9. A fast reactor according to claim 1, wherein the reactor core has a vertically columnar shape satisfying an equation of $H/D > 1$ and a ratio $L/H$ is about 0.3 to 0.7 in which the reactor core has a reactor core fuel portion having a height H and an equivalent diameter D and the reflector area has an effective vertical length L.

10. A fast reactor according to claim 1, wherein the annular portion includes a reactor shutdown rod elevation area which is defined on an outer peripheral side of the annular portion and in which a reactor shutdown rod is disposed to be vertically movable.

11. A fast reactor according to claim 10, wherein a reflector area is formed outside the reactor shutdown rod elevation area and a neutron absorber is further disposed outside the reflector area.

12. A fast reactor comprising:
a reactor vessel to be arranged vertically in a reactor building;
a reactor vessel upper structure disposed at an upper portion of the reactor vessel;
a drum structure suspended from the reactor vessel to substantially a central portion in the reactor vessel so as to define an annular portion between an outer periphery of the drum structure and an inner periphery of the reactor vessel;
a reactor core disposed in the drum structure;
an intermediate heat exchanger disposed at a portion above the reactor core;
a pump disposed in the reactor vessel to circulate coolant; and
a reflector disposed in the reactor vessel to fall along an outer periphery of the reactor core during reactor power operation, wherein the reflector is composed of materials each in the form of a grain and the reflector materials are stored in a storage tank disposed in an upper portion of a reflector area, the storage tank including an opening through which the reflector materials are supplied into the reflector area.

13. A fast reactor according to claim 12, wherein the opening of the storage tank is closed by a plug member which is thermally fused to open the same.

14. A fast reactor according to claim 12, wherein the storage tank is composed of a plurality of sections each provided with openings through which the reflector materials are supplied.

15. A fast reactor according to claim 14, wherein the reflector area is composed of a plurality of sections corresponding to the storage tank sections, respectively.

* * * * *